(12) United States Patent
Easley

(10) Patent No.: US 11,523,954 B2
(45) Date of Patent: Dec. 13, 2022

(54) APPARATUS FOR FACILITATING MANAGING MULTIPLE BIOLOGICAL FLUID CONTAINERS

(71) Applicant: Valentino Easley, Monrovia, CA (US)

(72) Inventor: Valentino Easley, Monrovia, CA (US)

( * ) Notice: Subject to any disclaimer, the term of this patent is extended or adjusted under 35 U.S.C. 154(b) by 0 days.

(21) Appl. No.: 17/591,594

(22) Filed: Feb. 2, 2022

(65) Prior Publication Data
US 2022/0241125 A1    Aug. 4, 2022

Related U.S. Application Data

(60) Provisional application No. 63/199,915, filed on Feb. 2, 2021.

(51) Int. Cl.
*A61G 7/05* (2006.01)
*F16M 11/42* (2006.01)
(Continued)

(52) U.S. Cl.
CPC .......... *A61G 7/0503* (2013.01); *F16M 11/28* (2013.01); *F16M 11/42* (2013.01); *A47F 7/00* (2013.01); *A47F 7/28* (2013.01); *B62B 5/00* (2013.01); *F16M 13/00* (2013.01); *F16M 2200/08* (2013.01)

(58) Field of Classification Search
CPC ...... A61G 7/0503; F16M 11/28; F16M 11/42; F16M 2200/08; F16M 13/00; A47F 7/00; A47F 7/28
See application file for complete search history.

(56) References Cited

U.S. PATENT DOCUMENTS 2,946,456 A * 7/1960 Liguori ................... A47F 7/283
                                                               211/77
9,596,966 B1   3/2017 Taylor
(Continued)

FOREIGN PATENT DOCUMENTS

EP          3006008 A4     1/2017
JP        2014233398 A  * 12/2014
WO    WO-2004096004 A2 * 11/2004  ............... B25H 3/06

OTHER PUBLICATIONS

IV Pole Mobile Chrome 6-Leg 4-Hook 24" Diameter Base Hvdty 2/Ca, Retrieved from Internet, Retrieved on Nov. 15, 2020 <URL: https://www.ciamedical.com/medline-mds80600-case-iv-pole-mobile-chrome-6-leg-4-hook-24-diameter-base-hvdty-2-ca>.

(Continued)

*Primary Examiner* — Tan Le

(57) ABSTRACT

Disclosed herein is an apparatus for facilitating managing multiple biological fluid containers. Accordingly, the apparatus may include a base configured to be stationarily and movably disposed on a surface for allowing a movement of the apparatus on the surface. Further, the allowing of the movement facilitates the managing of the biological fluid containers. Further, the apparatus may include a stand extending between a first end and a second end in relation to the base. Further, the apparatus may include a fluid holder tray attached to an upper portion of the stand proximal to the second end of the stand. Further, the fluid holder tray extends laterally away from the stand. Further, the fluid holder tray may be configured for holding biological fluid containers. Further, the fluid holder tray may include a plurality of receptacles.

19 Claims, 28 Drawing Sheets

(51) Int. Cl.
*F16M 11/28* (2006.01)
*A47F 7/00* (2006.01)
*F16M 13/00* (2006.01)
*B62B 5/00* (2006.01)
*A47F 7/28* (2006.01)

(56) References Cited

U.S. PATENT DOCUMENTS

| | | | |
|---|---|---|---|
| 2006/0157946 A1* | 7/2006 | Stuemke | B65F 1/1468 |
| | | | 280/79.5 |
| 2006/0163827 A1* | 7/2006 | Lauer | B62B 3/104 |
| | | | 280/47.35 |
| 2012/0273445 A1* | 11/2012 | Cregg | B62B 3/12 |
| | | | 211/85.8 |
| 2017/0363247 A1* | 12/2017 | Koehler | F16M 13/00 |

OTHER PUBLICATIONS

Omni Medical Pole Clamping System, Retrieved from Internet, Retrieved on Nov. 15, 2020 <URL: https://www.rehabmart.com/product/omni-clamping-system-40920.html>.

HK surgical KIP IV pole bracket, Retrieved from Internet, Retrieved on Nov. 15, 2020 <URL: https://mfimedical.com/products/hk-surgical-kip-iv-pole-bracket>.

Tablecraft BBQ3500 Chili Pepper Cone Holder/Roaster—11"×5", Stainless, Retrieved from Internet, Retrieved on Nov. 15, 2020 <URL: https://www.katom.com/229-BBQ3500.html?gclid=Cj0KCQiAwMP9BRCzARIsAPWTJ_EE4DN1yQg1r86VJpngEHI6u2c-IxzaUd31mMoKZK-wiUCMw_5AoZAaAjbzEALw_wcB>.

* cited by examiner

APPARATUS FOR FACILITATING MANAGING MULTIPLE BIOLOGICAL FLUID CONTAINERS

FIELD OF THE INVENTION

Generally, the present disclosure relates to the field of fluid handling and sanitary equipment. More specifically, the present disclosure relates to apparatuses for facilitating managing multiple biological fluid containers.

BACKGROUND OF THE INVENTION

The field of fluid handling and sanitary equipment is technologically important to several industries, business organizations, and/or individuals. In particular, the use of fluid handling and sanitary equipment is prevalent for facilitating the managing of multiple biological fluid containers.

Generally, contaminated surfaces and objects are responsible for the transmission of diseases causing microbes. However, one of the most elusive areas of transmission is when microorganisms such as bacteria, viruses, or fungi become aerial or vaporized. Further, the microorganism enters the respiratory tract and vascular circulation systems of an individual causing the individual to produce symptoms such as coughing and sneezing. Further, the individual produces large amounts of infectious fluid and mucous that may be spread by wiping one's mouth and nose. Further, the individual may be unknowingly contaminating vessels of common use and vessels of elimination causing more germs to be transmitted from one object to another. One of the most notorious microorganisms known today is the coronavirus, better known as COVID-19.

Health care facilities are considered high-risk environments for acquiring infections. Further, the health care facilities house patients with a weakened immune system and with a noted presence of disease-causing pathogens. Further, Healthcare Acquired Infections (HAIs) occur more frequently in health care facilities than in any other professional workplace/area. It is there that health care workers and patients may ingest/inhale contaminated vapors or more specifically, contaminated aerosolized microorganisms such as bacteria, fungi, protozoa, and viral pathogens.

It is quite evident that the microorganisms can enter the respiratory and vascular pulmonary circulatory/Systems, thus causing an increase in the production of mucus and phlegm, so the resulting symptoms may cause coughing, sneezing, and increased tearing. It is this infectious process that is more likely to be the culprit that individuals wiping their eyes, nose, or mouth with unwashed hands are transferring these germs to porous and non-porous fixtures such as bedrails, urinals, bedpans, and bedside tables just to name a few.

Therefore, there is a need for improved apparatuses for facilitating managing multiple biological fluid containers that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating managing multiple biological fluid containers, in accordance with some embodiments. Accordingly, the apparatus may include a base configured to be stationarily and movably disposed on at least one surface for allowing at least one movement of the apparatus on the at least one surface. Further, the allowing of the at least one movement facilitates the managing of the multiple biological fluid containers. Further, the at least one wheel may be configurable for discontinuously rotating around at least one axis. Further, the discontinuously rotating of the at least one wheel stationarily and movably disposes the base on the at least one surface. Further, the apparatus may include a stand extending between a first end and a second end in relation to the base. Further, the first end of the stand may be coupled with the base for vertically attaching the stand to the base. Further, the apparatus may include a fluid holder tray attached to an upper portion of the stand proximal to the second end of the stand. Further, the fluid holder tray extends laterally away from the stand. Further, the fluid holder tray may be configured for holding a plurality of biological fluid containers. Further, the fluid holder tray may include a plurality of receptacles. Further, the plurality of receptacles may be configured for removably receiving the plurality of biological fluid containers. Further, the plurality of receptacles may be configured for unmovably securing the plurality of biological fluid containers to the fluid holder tray based on receiving of the plurality of biological fluid containers. Further, the plurality of receptacles may include a plurality of orifices. Further, each of the plurality of orifices may be configured for receiving a hook comprised in each of the plurality of biological fluid containers. Further, the unmovably securing of the plurality of biological fluid containers may be based on the receiving of the hook. Further, the unmovably securing of each of the plurality of biological fluid containers prevents spilling of at least one biological fluid stored in an interior space of each of the plurality of biological fluid containers through an opening of each of the plurality of biological fluid containers during the at least one movement of the apparatus.

Further disclosed herein is an apparatus for facilitating managing multiple biological fluid containers, in accordance with some embodiments. Accordingly, the apparatus may include a base configured to be stationarily and movably disposed on at least one surface for allowing at least one movement of the apparatus on the at least one surface. Further, the allowing of the at least one movement facilitates the managing of the multiple biological fluid containers. Further, the at least one wheel may be configurable for discontinuously rotating around at least one axis. Further, the discontinuously rotating of the at least one wheel stationarily and movably disposes the base on the at least one surface. Further, the apparatus may include a stand extending between a first end and a second end in relation to the base. Further, the first end of the stand may be coupled with the base for vertically attaching the stand to the base. Further, the apparatus may include a fluid holder tray attached to an upper portion of the stand proximal to the second end of the stand. Further, the fluid holder tray extends laterally away from the stand. Further, the fluid holder tray may be configured for holding a plurality of biological fluid containers. Further, the fluid holder tray may include a plurality of receptacles. Further, the plurality of receptacles may be configured for removably receiving the plurality of biological fluid containers. Further, the plurality of receptacles may be configured for unmovably securing the plurality of biological fluid containers to the fluid holder tray based on receiving of the plurality of biological fluid containers. Further, the plurality of receptacles may include a plurality of orifices. Further, each of the plurality of orifices may be configured for receiving a hook comprised in each of the plurality of biological fluid containers. Further, the unmovably securing of the plurality of biological fluid containers may be based on the receiving of the hook. Further, the unmovably securing of each of the plurality of biological fluid containers prevents spilling of at least one biological fluid stored in an interior space of each of the plurality of biological fluid containers through an opening of each of the plurality of biological fluid containers during the at least one movement of the apparatus. Further, the apparatus may include at least one sensor disposed on the apparatus. Further, the at least one sensor may be configured for generating at least one sensor data based on detecting a level of a hazardous element present in the biological fluid. Further, the at least one sensor data may include the level of the hazardous element. Further, the apparatus may include a processing device communicatively coupled with the at least one sensor. Further, the processing device may be configured for analyzing the at least one sensor data. Further, the processing device may be configured for generating at least one precautionary measure based on the analyzing. Further, the at least one precautionary measure alerts at least one user about the hazard for protecting the at least one user from the hazard. Further, the apparatus may include a communication device communicatively coupled to the processing device. Further, the communication device may be configured for transmitting the at least one precautionary measure to at least one device associated with the at least one user.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
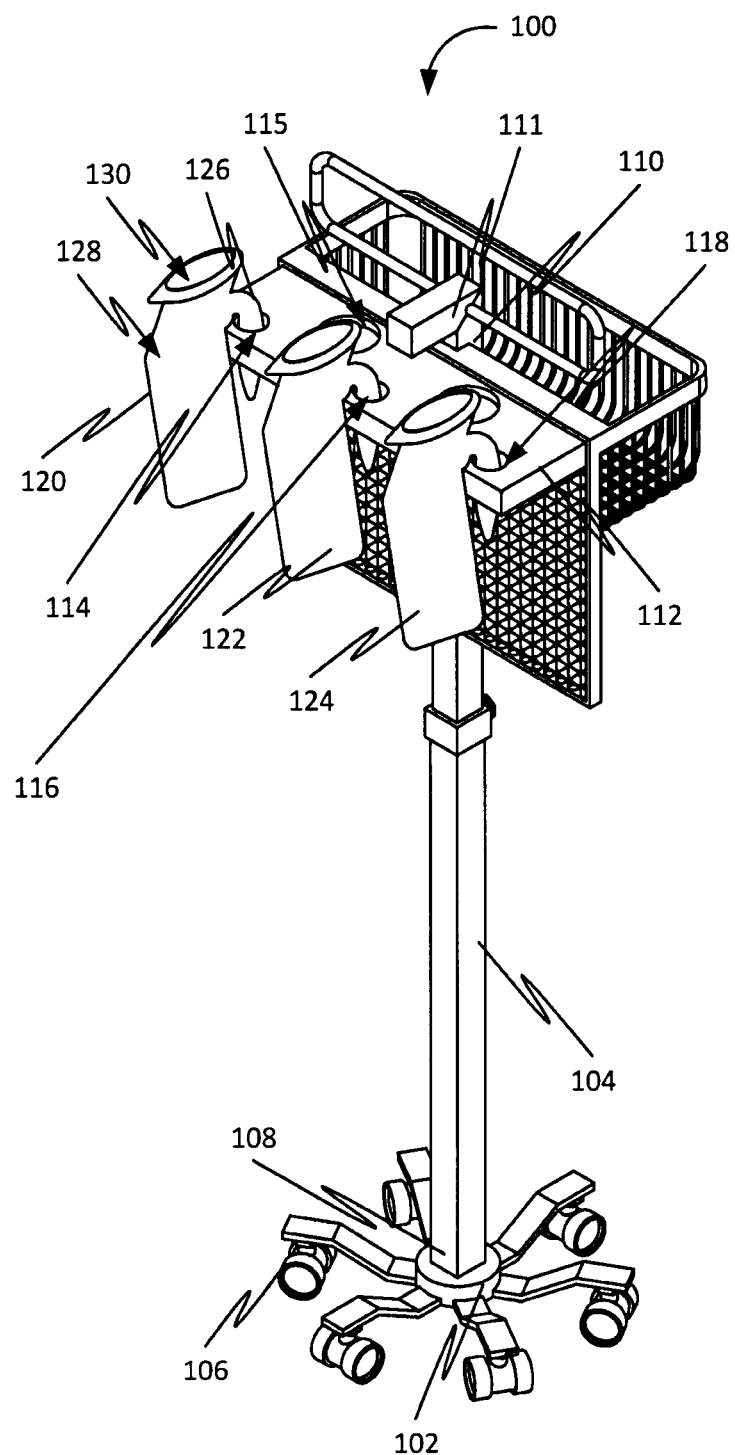
FIG. 1 is a front top right-side perspective view of an apparatus for facilitating managing multiple biological fluid containers, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating managing multiple biological fluid containers, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device. Overview:

The present disclosure describes methods, systems, apparatuses, and devices for facilitating managing multiple biological fluid containers. Further, the disclosed system may include a vertical standing urinal holding (or standing fixture) capable of holding multiple urine-filled containers in a safe, secure, and isolated position. Further, the disclosed system may provide a safe and reliable solution, as well as an improvement in the healthcare facility industry.

Further, the standing fixture may be capable of holding multiple urine-filled containers in a safe, secure, and isolated position. The standing fixture is designed to aid in minimizing infectious urine spillage and urine exposure for patients and health care providers and workers.

Further, the standing fixture keeps infectious bodily fluid away from a hospital bed, bedside railings, and bedside service table. The standing fixture is a sturdy lightweight fixture that is mobile and adjustable. Thus, the disclosed system allows for minimal handling and manipulation of urine when transmitting and discarding bodily fluids in bathrooms.

Further, the standing fixture may include a wheel base. Further, the wheel base may include a plurality of base arms, a plurality of wheels, a plurality of locking brakes, and an interfacing stand member. Further, in an embodiment, the wheel base may include six base arms from the plurality of base arms, but it is not limited to such configuration. Further, the base arms may be distributed radially throughout the circumference of the wheel base as shown in FIG. 1.

Further, each base arm from the plurality of base arms may include a wheel from a plurality of wheels. Further, a preferred number of wheels from the plurality of wheels matches the preferred number of base arms from the plurality of base arms. Further, in an instance, the wheels base may include six wheels from the plurality of wheels. The wheels may be distributed radially throughout the circumference of the wheel base similar to the base arms.

Furthermore, the wheels from the plurality of wheels may include a plurality of locking brakes. Further, a number of locking brakes from the plurality locking brakes matches the preferred number of wheels from the plurality of wheels. Therefore, the wheel base may include six locking brakes from the plurality of brakes.

Additionally, the plurality of locking brakes may include any and all industry-standard locking brakes, as well as any variable locking brake system. For instance, the plurality of locking brakes may be part of a locking brake system in which a lever, a tab, a switch, or any activating component locks and unlocks the plurality of brakes. Further, the lever, the tab, the switch, or the activating component may be located anywhere on the standing fixture that fulfills user, design, and/or manufacturing requirements.

Further, the wheel base may include the interfacing stand member that serves as an interfacing attaching member between the wheel base and a main outer stand. The main outer stand may be a main vertical support structure for the standing fixture. The interfacing stand member may include a cylindrical geometrical profile as shown in FIG. 1. Further, the interfacing stand member, the plurality of base arms, the plurality of wheels, and the plurality of locking brakes all comprise the wheel base for the present invention.

Further, the standing fixture may include the main outer stand. Further, the main outer stand may be a main vertical support member for the standing disclosure. Further, the main outer stand functions as a sleeve or receptacle for a main inner stand. Further, the main outer stand may include a hollowed square prism geometrical profile. Further, a hollow portion of the main outer stand allows for the main inner stand to slide within the main outer stand. Thus, the arrangement of the main outer stand and the main inner stand allows full versatility and adjustability for the total height of the standing fixture.

Furthermore, in order to securely lock the main outer stand and the main inner stand, the standing fixture may include an adjusting member. Further, the adjusting member may include an adjusting sleeve that functions as the interfacing member between the main outer stand and the main inner stand.

Further, the adjusting member may include an adjusting knob that provides a force perpendicular to the main inner stand and the main outer stand. Therefore, the adjusting knob safely secures the main inner stand at a desired height and position. Additionally, the arrangement between the main outer stand, the main inner stand, and the adjusting member is not limited to the aforementioned configuration.

Furthermore, the adjusting member may include any components or arrangement that allows for temporary locking of the main outer stand and the main inner stand. Therefore, any modification or variation of the adjusting member is still considered within the scope of the present invention.

Additionally, the standing fixture may include a rear guard. Further, the rear guard may include an outer frame with a plurality of rod-like members distributed within the frame forming a web-like structure as shown in FIG. 1.

Further, the rear guard may be oriented parallel to the main inner frame and preferably may include a square or rectangular geometrical profile. Furthermore, the standing fixture comprises a urinal holder tray. The urinal holder tray may be perpendicular to the rear guard. The urinal holder tray comprises a parallelepiped geometrical profile. Further, the urinal holder tray, as shown in FIG. 1, may include a plurality of urinal receptacles and a plurality of sterile cups receptacles. Further, a preferred number of urinal receptacles may be three, but it is not limited to such arrangement or configuration.

Additionally, a preferred number of sterile cup receptacles is two, but it is not limited to such arrangement or configuration. The urinal receptacles from the plurality of urinal receptacles are orifices on the urinal holder tray, meanwhile, the sterile cup receptacles from the plurality of sterile cup receptacles are indentations on the urinal holder tray. Additionally, the present invention may include a plurality of urinal receptacle inserts. Further, a preferred number of urinal receptacle inserts from the plurality of urinal receptacle inserts matches the preferred number of urinal receptacles from the plurality of urinal receptacles, but it is not limited to such arrangement or configuration.

Further, the urinal receptacle inserts may be interfacing with members that have a tight fit within the urinal receptacles. The urinal receptacle inserts provide more stability and a slight tilting to a urinal when it is placed through the urinal receptacles. Furthermore, the arrangement and configuration of the rear guard, the urinal holder tray, the plurality of urinal receptacles, the plurality of sterile cups receptacles, and the plurality of urinal receptacle inserts are not limited to the aforementioned description.

Further, the standing fixture may include a basket. The basket is located parallel to the main inner stand opposite to the rear guard. The basket may include a basket frame that is oriented perpendicular to the main inner stand with a plurality of C-shaped rod-like members distributed throughout the basket frame forming a web-like basket structure.

Further, the standing fixture may include a vertical handle. The vertical handle may be located on an upper portion of the main inner stand. The vertical handle may be oriented parallel to the main inner stand, thus forming a vertical alignment. The vertical handle comprises a rectangular geometrical profile with round corners. The vertical handle allows the safe and secure handling of the standing fixture within a healthcare facility. Further, the vertical handle may facilitate easy maneuvering for the mobility of the apparatus (or urinal stand).

Further, Euro-Stand, an exemplary embodiment of the disclosed system herein, may be a vertical standing urinal (urine) holding system. Further, the disclosed apparatus (or standing fixture) may be capable of holding multiple urine-filled containers in a safe, secure, and isolated position. Further, the disclosed apparatus may minimize infectious urine spillage and urine exposure for patients and health care providers/workers. Further, the apparatus may keep infectious bodily fluid away from the patient's hospital bed, bedsides railings, and patient bedside service table. Further, the apparatus (or sturdy lightweight stainless-steel/alloy vertical urinal standing fixture) may be mobile and adjustable thus allowing the health care workers and family members to minimally handle and manipulate urine when transmitting and discarding bodily fluids in bathrooms. Further, latex gloves may be worn at all times.

Furthermore, the arrangement and configuration of the basket and the vertical handle are not limited to the aforementioned description.

Referring now to figures, FIG. 1 is a front top right-side perspective view of an apparatus 100 for facilitating managing multiple biological fluid containers, in accordance with some embodiments. Accordingly, the apparatus 100 may include a base 102 configured to be stationarily and movably disposed on at least one surface for allowing at least one movement of the apparatus 100 on the at least one surface. Further, the allowing of the at least one movement facilitates the managing of the multiple biological fluid containers. Further, the base 102 may include at least one wheel 106 configurable for discontinuously rotating around at least one axis. Further, the discontinuously rotating of the at least one wheel 106 stationarily and movably disposes the base 102 on the at least one surface.

Further, the apparatus 100 may include a stand 104 extending between a first end 108 and a second end 110 in relation to the base 102. Further, the first end 108 of the stand 104 may be coupled with the base 102 for vertically attaching the stand 104 to the base 102.

Figure 2:
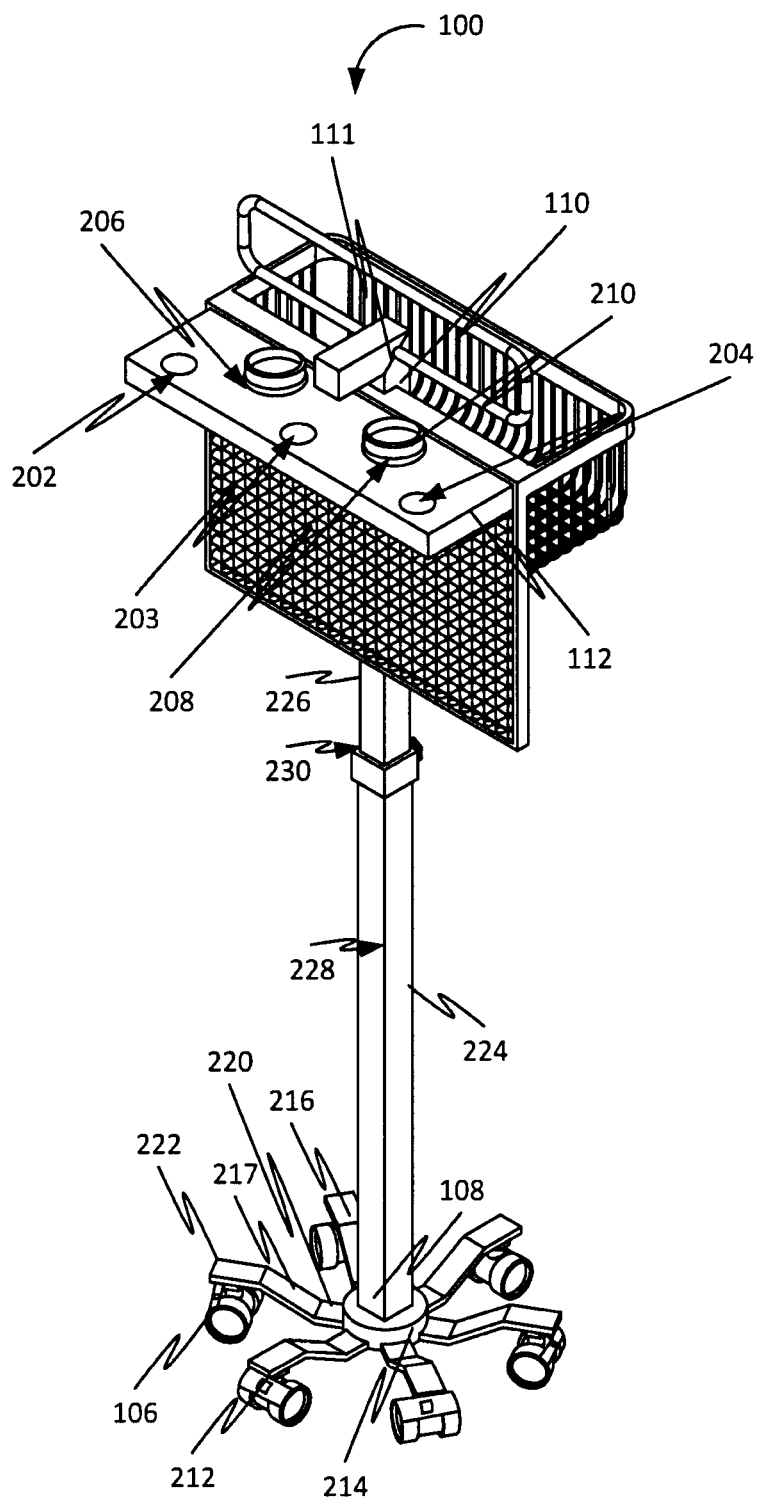
FIG. 2 is a front top right-side perspective view of the apparatus for facilitating managing multiple biological fluid containers, in accordance with some embodiments.

Further, the apparatus 100 may include a fluid holder tray 112 attached to an upper portion 111 of the stand 104 proximal to the second end 110 of the stand 104. Further, the fluid holder tray 112 extends laterally away from the stand 104. Further, the fluid holder tray 112 may be configured for holding a plurality of biological fluid containers 120-124. Further, the fluid holder tray 112 may include a plurality of receptacles 114-118. Further, the plurality of receptacles 114-118 may be configured for removably receiving the plurality of biological fluid containers 120-124. Further, the plurality of receptacles 114-118 may be configured for unmovably securing the plurality of biological fluid containers 120-124 to the fluid holder tray 112 based on receiving of the plurality of biological fluid containers 120-124. Further, the plurality of receptacles 114-118 may include a plurality of orifices 202-204 (as shown in FIG. 2). Further, each of the plurality of orifices 202-204 may be configured for receiving a hook 126 comprised in each of the plurality of biological fluid containers 120-124. Further, the unmovably securing of the plurality of biological fluid containers 120-124 may be based on the receiving of the hook 126. Further, the unmovably securing of each of the plurality of biological fluid containers 120-124 prevents spilling of at least one biological fluid stored in an interior space 128 of each of the plurality of biological fluid containers 120-124 through an opening 130 of each of the plurality of biological fluid containers 120-124 during the at least one movement of the apparatus 100. Further, the at least one biological fluid may include blood, urine, bodily fluids, etc.

Further, in some embodiments, the plurality of receptacles 114-118 may include a plurality of indentations 206-208 (as shown in FIG. 2). Further, each of the plurality of indentations 206-208 may be configured for receiving a body 210 (as shown in FIG. 2) of each of the plurality of biological fluid containers 120-124. Further, the receiving of the body 210 of each of the plurality of biological fluid containers 120-124 snugly disposes each of the plurality of biological fluid containers 120-124 in each of the plurality of indentations 206-208 for the unmovably securing of each of the plurality of biological fluid containers 120-124 to the fluid holder tray 112.

Further, in some embodiments, the base 102 may include a locking brake 212 (as shown in FIG. 2) operationally coupled with the at least one wheel 106. Further, the locking brake 212 may be configured for transitioning between a locked state and an unlocked state. Further, the locking brake 212 may be configured for arresting rotating of the at least one wheel 106 in the locked for stationarily disposing the base 102 on the at least one surface. Further, the locking brake 212 may be configured for allowing the rotating of the at least one wheel 106 for movably disposing the base 102 on the at least one surface. Further, the allowing of the at least one movement may be based on the stationarily disposing of the base 102 and the movably disposing of the base 102.

Further, in some embodiments, the base 102 may include a wheel base 214 (as shown in FIG. 2). Further, the wheel base 214 may include a plurality of base arms 216-218 (as shown in FIG. 2) radially attached to the wheel base 214 for vertically supporting the stand 104 on the wheel base 214. Further, a proximal end 220 (as shown in FIG. 2) of the each of the plurality of base arms 216-218 may be attached to the wheel base 214 and a distal end 222 (as shown in FIG. 2) of each of the plurality of base arms 216-218 extends radially away from the wheel base 214. Further, the at least one wheel 106 may be attached to a distal portion of each of the plurality of arms proximal to the distal end 222 of each of the plurality of base arms 216-218.

Further, in some embodiments, the stand 104 may include an outer stand 224 (as shown in FIG. 2) and an inner stand 226 (as shown in FIG. 2). Further, the outer stand 224 may include a receptacle 228 (as shown in FIG. 2) and a stand opening 230 (as shown in FIG. 2) leading into the receptacle 228. Further, the inner stand 226 may be movably disposed in the receptacle 228 through the stand opening 230. Further, the inner stand 226 may be configured to be retractably extending between a plurality of positions in relation to the outer stand 224 based on movably disposing of the inner stand 226 in the outer stand 224. Further, the retractably extending of the inner stand 226 adjusts a length of the stand 104 defined between the first end 108 and the second end 110. Further, the length of the stand 104 corresponds to one of the plurality of positions.

Figure 3:
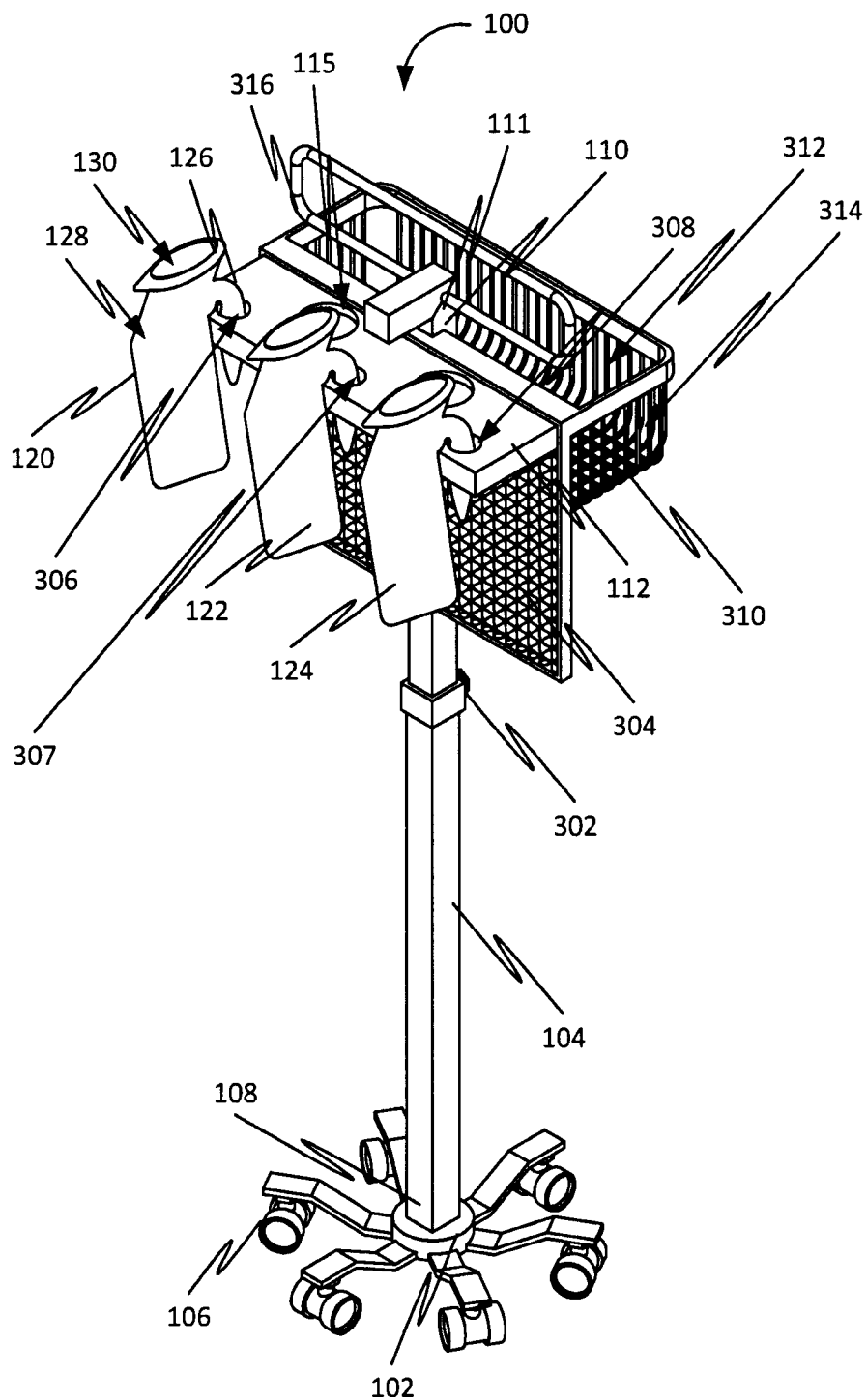
FIG. 3 is a front top right-side perspective view of the apparatus for facilitating managing multiple biological fluid containers, in accordance with some embodiments.

In further embodiments, the apparatus 100 may include an adjusting member 302 (as shown in FIG. 3) operationally coupled with the stand 104. Further, the adjusting member 302 may be configured for disengagebly engaging the inner stand 226 with the outer stand 224 for unlockably locking the inner stand 226 to the one of the plurality of positions based on the retractably extending.

In further embodiments, the apparatus 100 may include a rear guard 304 (as shown in FIG. 3) coupled with the stand 104. Further, the rear guard 304 may be attached to the upper portion 111 of the stand 104. Further, the rear guard 304 may be oriented perpendicular to the fluid holder tray 112. Further, the rear guard 304 may be configurable for elastically deforming based on an impact received by the plurality of biological fluid containers 120-124 corresponding to a movement of the plurality of biological fluid containers 120-124. Further, the elastically deforming dampens the movement of the plurality of biological fluid containers 120-124. Further, the dampening of the movement of the plurality of biological fluid containers 120-124 prevents the spilling of the at least one biological fluid.

Further, in some embodiments, the fluid holder tray 112 may include a plurality of receptacle inserts 306-308 (as shown in FIG. 3) disposed in the plurality of receptacles 114-118. Further, the plurality of receptacle inserts 306-308 may be configured for inwardly pressing the plurality of biological fluid containers 120-124 received in the plurality of receptacles 114-118. Further, the unmovably securing of the plurality of biological fluid containers 120-124 may be based on the inwardly pressing.

Further, in some embodiments, the plurality of receptacle inserts 306-308 may be configured for orienting the plurality of biological fluid containers 120-124 received in the plurality of receptacles 114-118 in at least one orientation. Further, the inwardly pressing may include directionally inwardly pressing of the plurality of biological fluid containers 120-124 in at least one direction in relation to the stand 104. Further, the orienting of the plurality of biological fluid containers 120-124 may be based on the directionally inwardly pressing of the plurality of biological fluid containers 120-124.

In further embodiments, the apparatus 100 may include a basket 310 (as shown in FIG. 3) attached to the upper portion 111 of the stand 104. Further, the basket 310 opposes the fluid holder tray 112. Further, the basket 310 may include a basket opening 312 (as shown in FIG. 3) and a basket interior space 314 (as shown in FIG. 3). Further, the plurality of biological fluid containers 120-124 may include at least one additional biological fluid container. Further, the basket 310 may be configured for removably receiving the at least one additional biological fluid container in the basket interior space 314 through the basket opening 312.

Further, in some embodiments, the stand 104 may include a handle 316 (as shown in FIG. 3) attached to the upper portion 111 of the stand 104 proximal to the second end 110. Further, the handle 316 may be configured for receiving at least one moving action. Further, the discontinuously rotating of the at least one wheel 106 may be based on the receiving of the at least one moving action. Further, the handle 316 may include a rectangular geometrical profile with round corners. Further, the handle 316 allows the safe and secure handling of the apparatus 100 within a healthcare facility.

Figure 4:
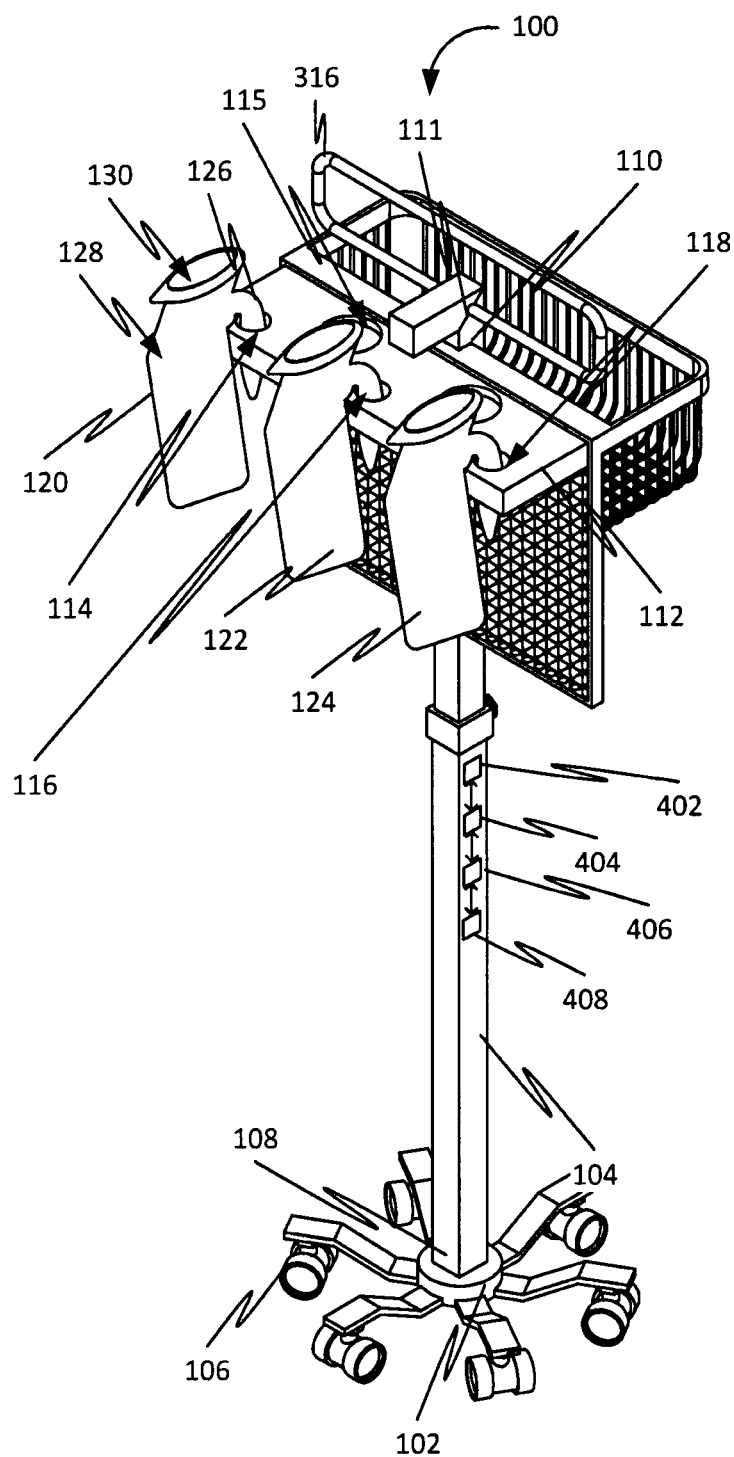
FIG. 4 is a front top right-side perspective view of the apparatus for facilitating managing multiple biological fluid containers, in accordance with some embodiments.

In further embodiments, the apparatus 100 may include at least one sensor 402 (as shown in FIG. 4) disposed on the apparatus 100. Further, the at least one sensor 402 may be configured for generating at least one sensor data based on detecting a level of a hazardous element present in the biological fluid. Further, the at least one sensor 402 may include a chemical sensor, a biosensor, etc. Further, the hazardous element may include a microorganism, a pathogen, a chemical compound, etc. Further, the at least one sensor data may include the level of the hazardous element. Further, the apparatus 100 may include a processing device 404 (as shown in FIG. 4) communicatively coupled with the at least one sensor 402. Further, the processing device 404 may be configured for analyzing the at least one sensor data. Further, the processing device 404 may be configured for generating at least one precautionary measure based on the analyzing. Further, the at least one precautionary measure alerts at least one user about the hazard for protecting the at least one user from the hazard. Further, in an instance, the at least one precautionary measure may include a standard operating procedure for handling the at least one biological fluid. Further, in an isntance, the at least one precautionary measure may include a safe distance between an individual and the apparatus 100 for safe handling of the at least one biological fluid. Further, the apparatus 100 may include a communication device 406 (as shown in FIG. 4) communicatively coupled to the processing device 404. Further, the communication device 406 may be configured for transmitting the at least one precautionary measure to at least one device 408 associated with the at least one user.

Figure 5:
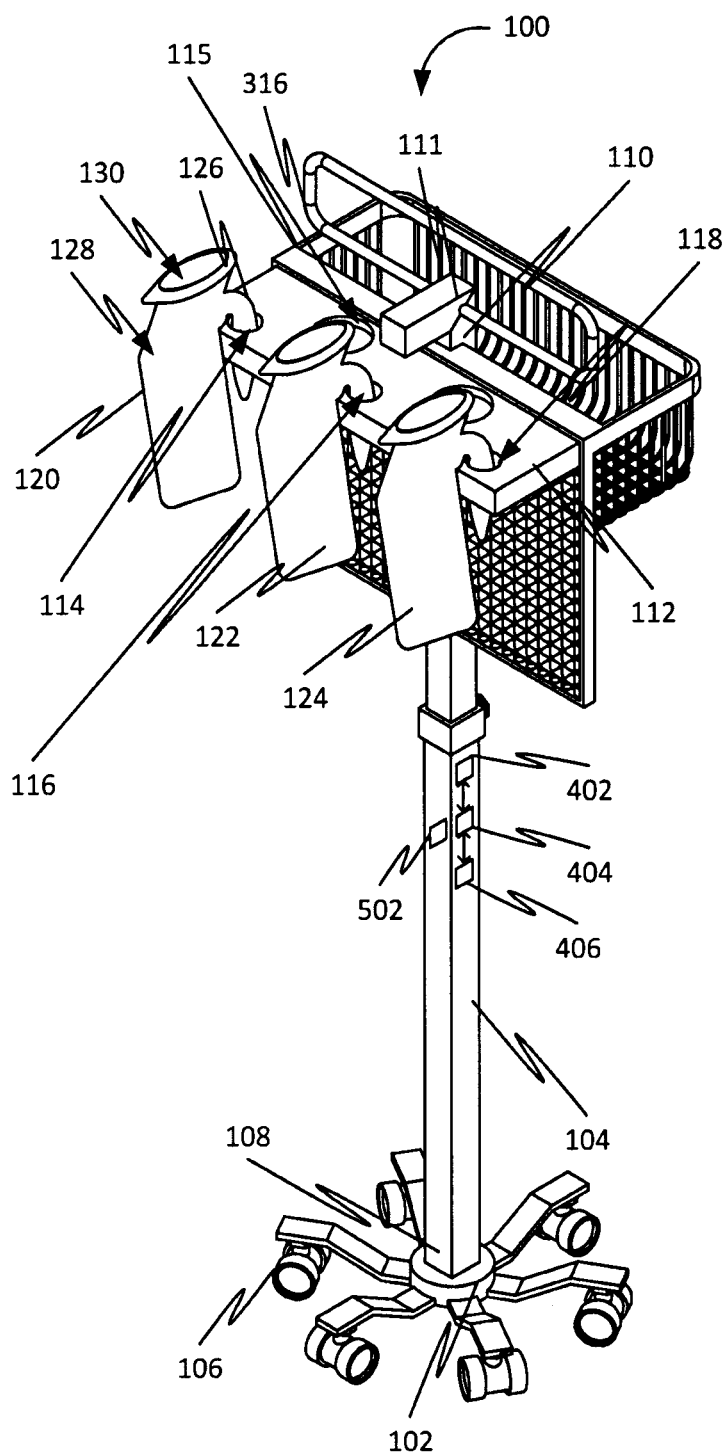
FIG. 5 is a front top right-side perspective view of the apparatus for facilitating managing multiple biological fluid containers, in accordance with some embodiments.

In further embodiments, the apparatus 100 may include an output device 502 (as shown in FIG. 5) communicatively coupled to the processing device 404. Further, the output device 502 may be configured for presenting the at least one precautionary measure.

FIG. 2 is a front top right-side perspective view of the apparatus 100 for facilitating managing multiple biological fluid containers, in accordance with some embodiments.

FIG. 3 is a front top right-side perspective view of the apparatus 100 for facilitating managing multiple biological fluid containers, in accordance with some embodiments.

FIG. 4 is a front top right-side perspective view of the apparatus 100 for facilitating managing multiple biological fluid containers, in accordance with some embodiments.

FIG. 5 is a front top right-side perspective view of the apparatus 100 for facilitating managing multiple biological fluid containers, in accordance with some embodiments.

Figure 6:
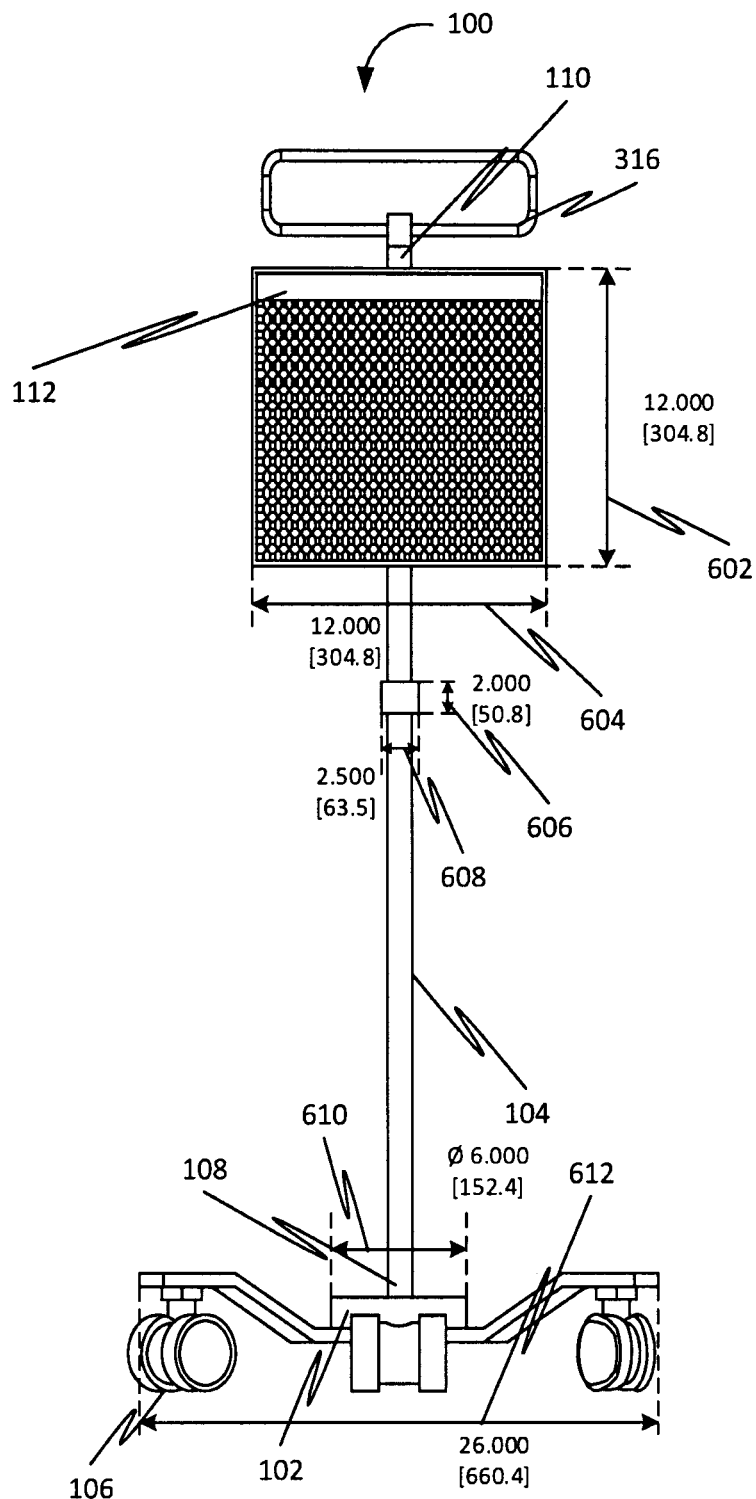
FIG. 6 is a front view of the apparatus for facilitating managing multiple biological fluid containers, in accordance with some embodiments.

FIG. 6 is a front view of the apparatus 100 for facilitating managing multiple biological fluid containers, in accordance with some embodiments. Accordingly, a length 602 associated with the rear guard 304 may be 12 inches. Further, a width 604 associated with the rear guard 304 may be 12 inches. Further, a height 606 associated with the adjusting member 302 may be 2 inches. Further, a width 608 associated with the adjusting member 302 may be 2.5 inches. Further, a diameter 610 associated with the base 102 may be 6 inches. Further, a width 612 associated with the base 102 may be 26 inches.

Figure 7:
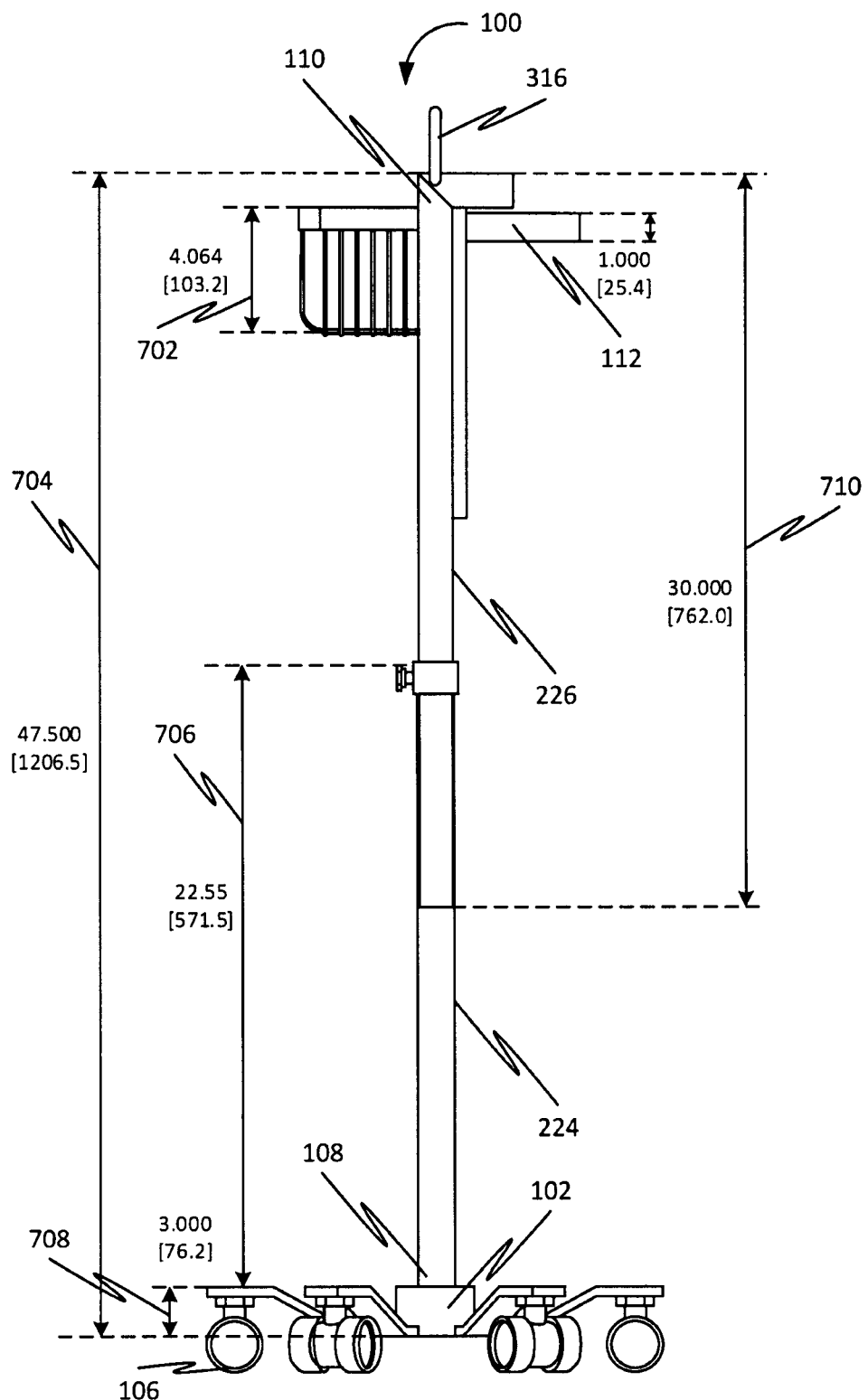
FIG. 7 is a right-side view of the apparatus for facilitating managing multiple biological fluid containers, in accordance with some embodiments.

FIG. 7 is a right-side view of the apparatus 100 for facilitating managing multiple biological fluid containers, in accordance with some embodiments. Further, a length 702 associated with the basket 310 may be 4.064 inches. Further, a height 704 associated with the apparatus 100 may be 47.5 inches. Further, a height 706 associated with the outer stand 224 may be 22.55 inches. Further, a height 708 associated with the wheel base 214 may be 3.0 inches. Further, a height 710 associated with the inner stand 226 may be 30 inches.

Figure 8:
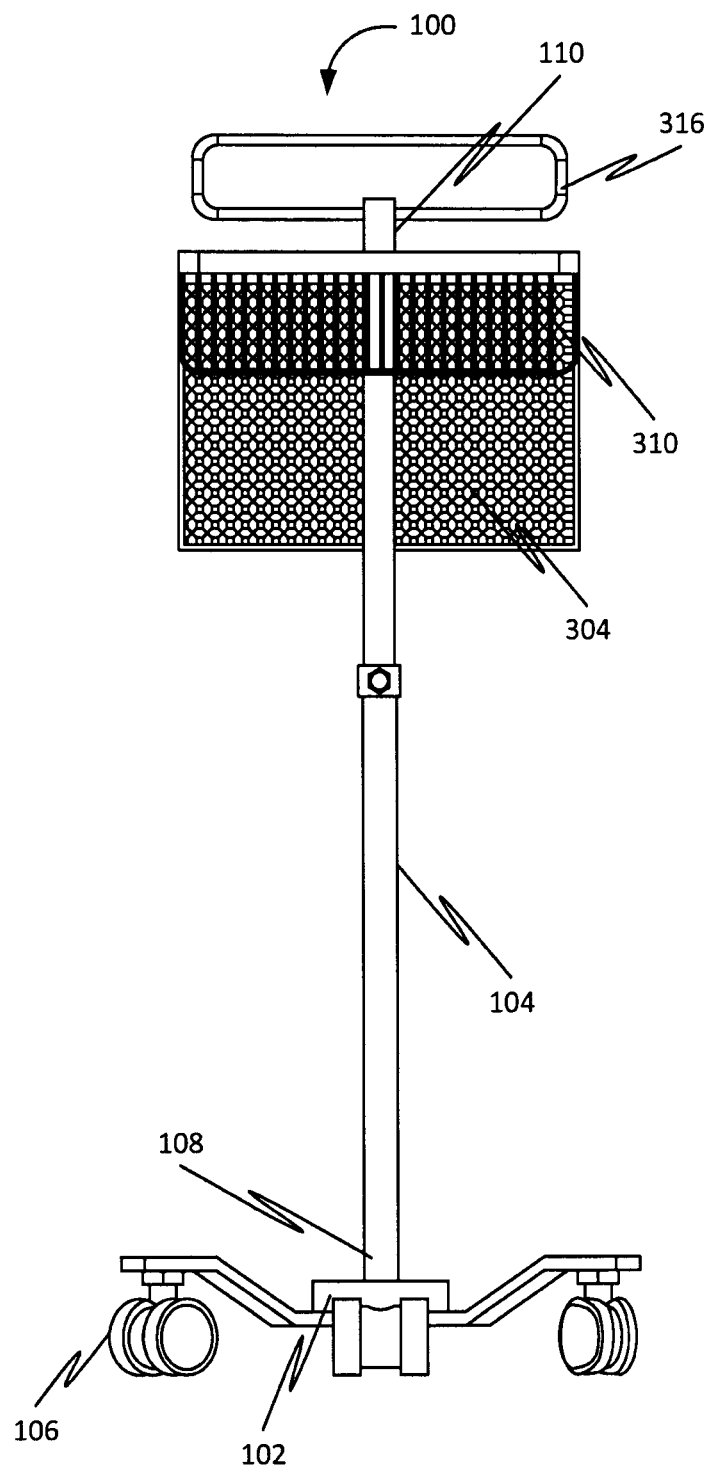
FIG. 8 is a rear view of the apparatus for facilitating managing multiple biological fluid containers, in accordance with some embodiments.

FIG. 8 is a rear view of the apparatus 100 for facilitating managing multiple biological fluid containers, in accordance with some embodiments.

Figure 9:
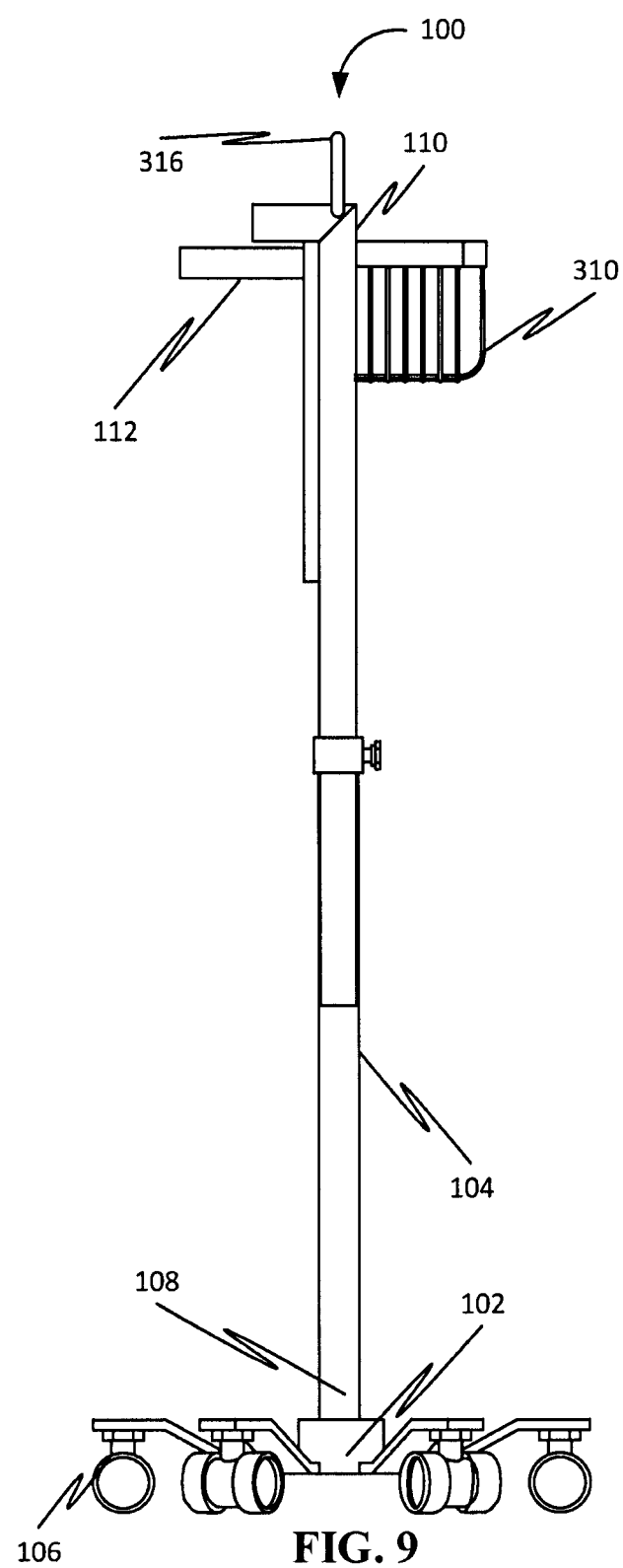
FIG. 9 is a left-side view of the apparatus for facilitating managing multiple biological fluid containers, in accordance with some embodiments.

FIG. 9 is a left-side view of the apparatus 100 for facilitating managing multiple biological fluid containers, in accordance with some embodiments.

Figure 10:
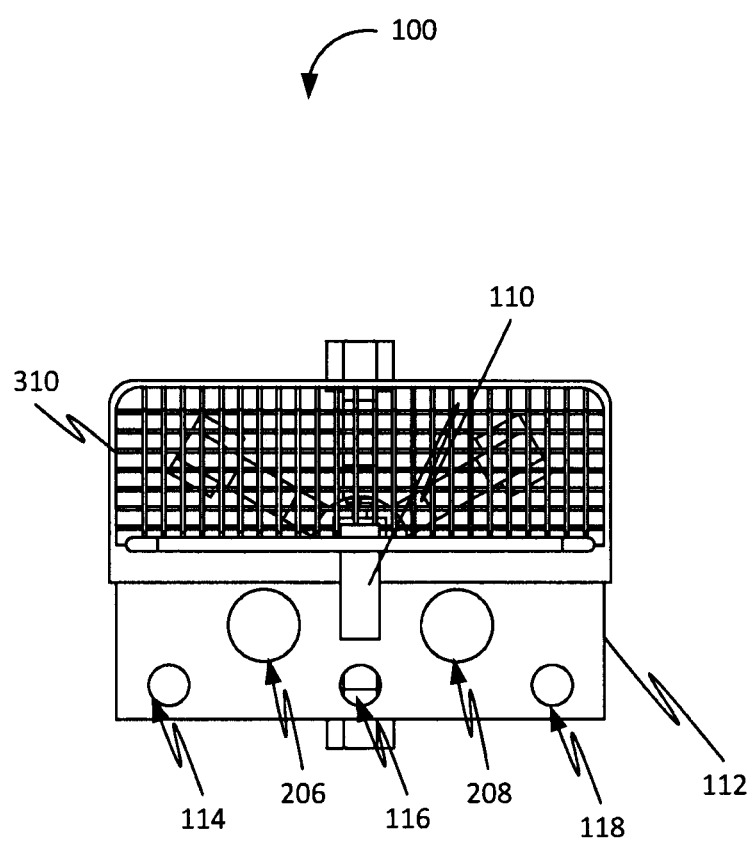
FIG. 10 is a top view of the apparatus for facilitating managing multiple biological fluid containers, in accordance with some embodiments.

FIG. 10 is a top view of the apparatus 100 for facilitating managing multiple biological fluid containers, in accordance with some embodiments.

Figure 11:
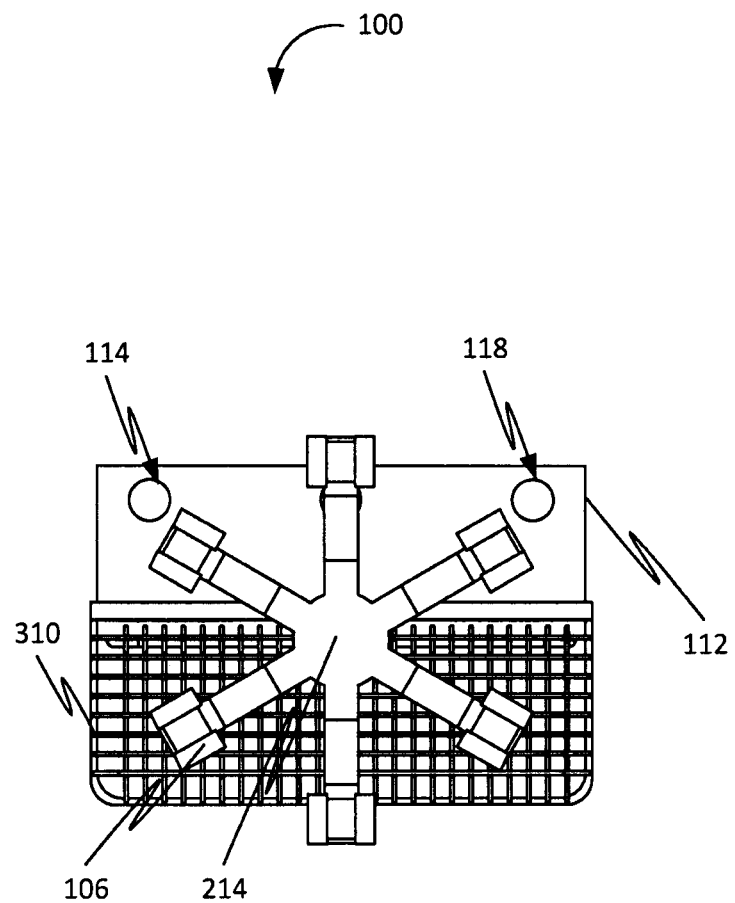
FIG. 11 is a bottom view of the apparatus for facilitating managing multiple biological fluid containers, in accordance with some embodiments.

FIG. 11 is a bottom view of the apparatus 100 for facilitating managing multiple biological fluid containers, in accordance with some embodiments.

Figure 12:
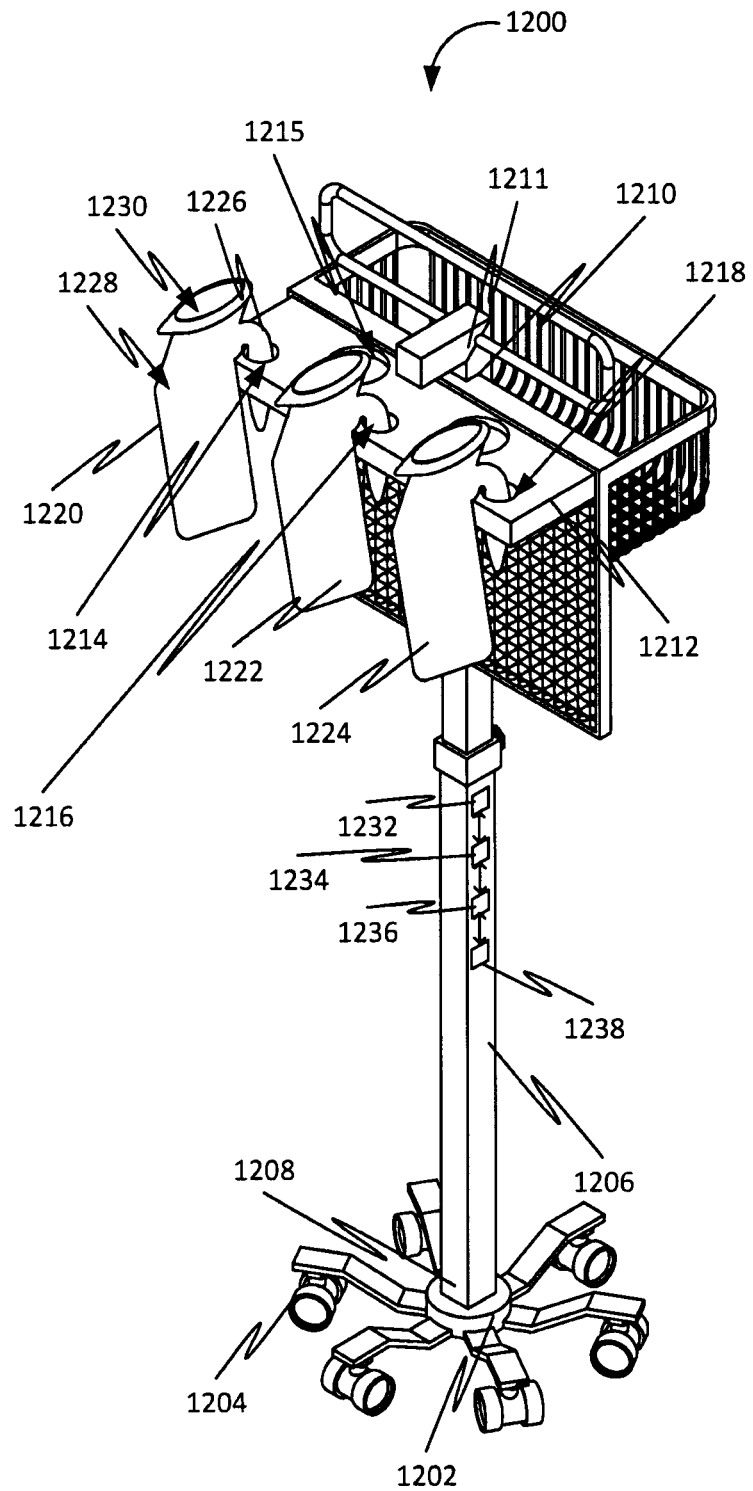
FIG. 12 is a front top right-side perspective view of an apparatus for facilitating managing multiple biological fluid containers, in accordance with some embodiments.
Figure 13:
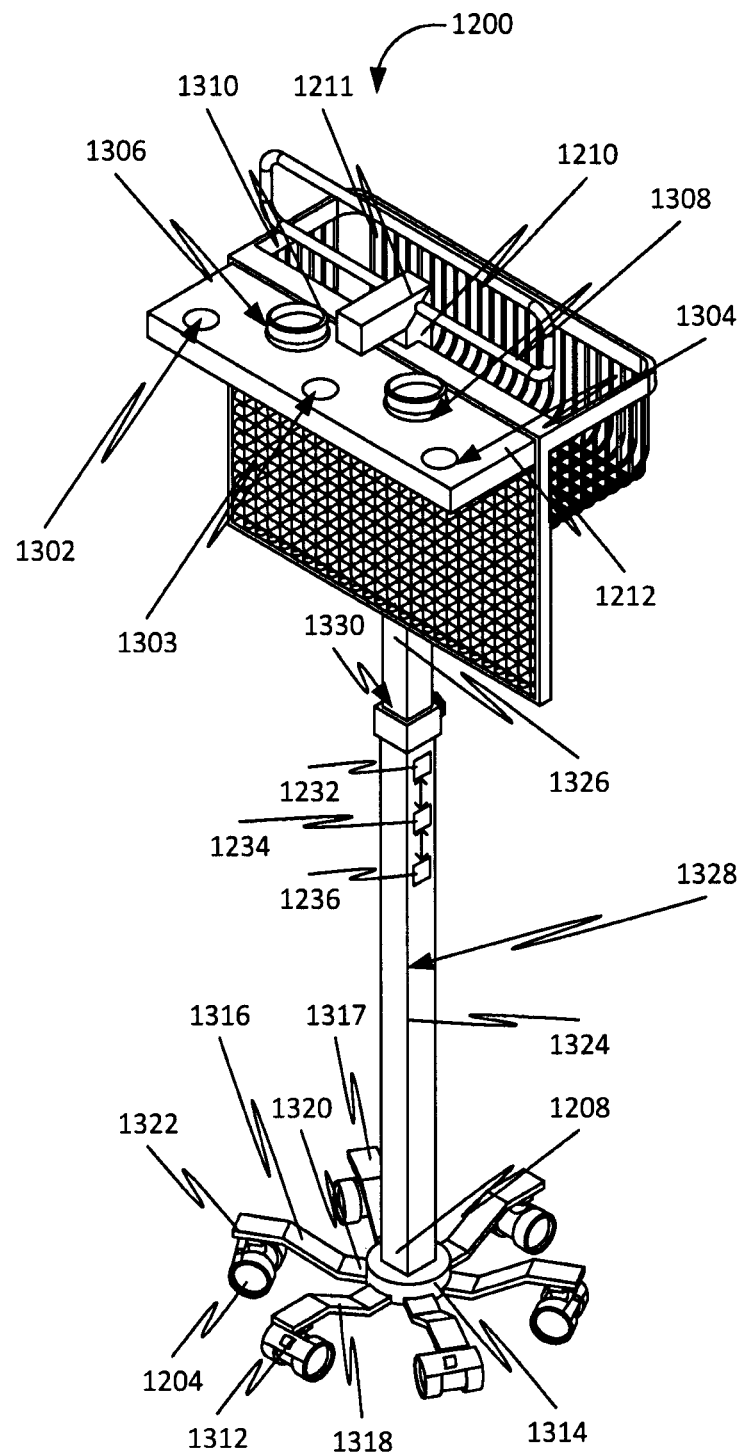
FIG. 13 is a front top right-side perspective view of the apparatus for facilitating managing multiple biological fluid containers, in accordance with some embodiments.

FIG. 12 is a front top right-side perspective view of an apparatus 1200 for facilitating managing multiple biological fluid containers, in accordance with some embodiments. Accordingly, the apparatus 1200 may include a base 1202 configured to be stationarily and movably disposed on at least one surface for allowing at least one movement of the apparatus 1200 on the at least one surface. Further, the allowing of the at least one movement facilitates the managing of the multiple biological fluid containers. Further, the base 1202 may include at least one wheel 1204 configurable for discontinuously rotating around at least one axis. Further, the discontinuously rotating of the at least one wheel 1204 stationarily and movably disposes the base 1202 on the at least one surface. Further, the apparatus 1200 may include a stand 1206 extending between a first end 1208 and a second end 1210 in relation to the base 1202. Further, the first end 1208 of the stand 1206 may be coupled with the base 1202 for vertically attaching the stand 1206 to the base 1202. Further, the apparatus 1200 may include a fluid holder tray 1212 attached to an upper portion 1211 of the stand 1206 proximal to the second end 1210 of the stand 1206. Further, the fluid holder tray 1212 extends laterally away from the stand 1206. Further, the fluid holder tray 1212 may be configured for holding a plurality of biological fluid containers 1220-1224. Further, the fluid holder tray 1212 may include a plurality of receptacles 1214-1218. Further, the plurality of receptacles 1214-1218 may be configured for removably receiving the plurality of biological fluid containers 1220-1224. Further, the plurality of receptacles 1214-1218 may be configured for unmovably securing the plurality of biological fluid containers 1220-1224 to the fluid holder tray 1212 based on receiving of the plurality of biological fluid containers 1220-1224. Further, the plurality of receptacles 1214-1218 may include a plurality of orifices 1302-1304 (as shown in FIG. 13). Further, each of the plurality of orifices 1302-1304 may be configured for receiving a hook 1226 comprised in each of the plurality of biological fluid containers 1220-1224. Further, the unmovably securing of the plurality of biological fluid containers 1220-1224 may be based on the receiving of the hook 1226. Further, the unmovably securing of each of the plurality of biological fluid containers 1220-1224 prevents spilling of at least one biological fluid stored in an interior space 1228 of each of the plurality of biological fluid containers 1220-1224 through an opening 1230 of each of the plurality of biological fluid containers 1220-1224 during the at least one movement of the apparatus 1200. Further, the apparatus 1200 may include at least one sensor 1232 disposed on the apparatus 1200. Further, the at least one sensor 1232 may be configured for generating at least one sensor data based on detecting a level of a hazardous element present in the biological fluid. Further, the at least one sensor data may include the level of the hazardous element. Further, the apparatus 1200 may include a processing device 1234 communicatively coupled with the at least one sensor 1232. Further, the processing device 1234 may be configured for analyzing the at least one sensor data. Further, the processing device 1234 may be configured for generating at least one precautionary measure based on the analyzing. Further, the at least one precautionary measure alerts at least one user about the hazard for protecting the at least one user from the hazard. Further, the apparatus 1200 may include a communication device 1236 communicatively coupled to the processing device 1234. Further, the communication device 1236 may be configured for transmitting the at least one precautionary measure to at least one device 1238 associated with the at least one user.

Further, in some embodiments, the plurality of receptacles 1214-1218 may include a plurality of indentations 1306-1308 (as shown in FIG. 13). Further, each of the plurality of indentations 1306-1308 may be configured for receiving a body 1310 (as shown in FIG. 13) of each of the plurality of biological fluid containers 1220-1224. Further, the receiving of the body 1310 of each of the plurality of biological fluid containers 1220-1224 snugly disposes each of the plurality of biological fluid containers 1220-1224 in each of the plurality of indentations 1306-1308 for the unmovably securing of each of the plurality of biological fluid containers 1220-1224 to the fluid holder tray 1212.

Further, in some embodiments, the base 1202 may include a locking brake 1312 (as shown in FIG. 13) operationally coupled with the at least one wheel 1204. Further, the locking brake 1312 may be configured for transitioning between a locked state and an unlocked state. Further, the locking brake 1312 may be configured for arresting rotating of the at least one wheel 1204 in the locked for stationarily disposing the base 1202 on the at least one surface. Further, the locking brake 1312 may be configured for allowing the rotating of the at least one wheel 1204 for movably disposing the base 1202 on the at least one surface. Further, the allowing of the at least one movement may be based on the stationarily disposing of the base 1202 and the movably disposing of the base 1202.

Further, in some embodiments, the base 1202 may include a wheel base 1314 (as shown in FIG. 13). Further, the wheel base 1314 may include a plurality of base arms 1316-1318 (as shown in FIG. 13) radially attached to the wheel base 1314 for vertically supporting the stand 1206 on the wheel base 1314. Further, a proximal end 1320 (as shown in FIG. 13) of the each of the plurality of base arms 1316-1318 may be attached to the wheel base 1314 and a distal end 1322 (as shown in FIG. 13) of each of the plurality of base arms 1316-1318 extends radially away from the wheel base 1314. Further, the at least one wheel 1204 may be attached to a distal portion of each of the plurality of arms proximal to the distal end 1322 of each of the plurality of base arms 1316-1318.

Further, in some embodiments, the stand 1206 may include an outer stand 1324 (as shown in FIG. 13) and an inner stand 1326 (as shown in FIG. 13). Further, the outer stand 1324 may include a receptacle 1328 (as shown in FIG. 13) and a stand opening 1330 (as shown in FIG. 13) leading into the receptacle 1328. Further, the inner stand 1326 may be movably disposed in the receptacle 1328 through the stand opening 1330. Further, the inner stand 1326 may be configured to be retractably extending between a plurality of positions in relation to the outer stand 1324 based on movably disposing of the inner stand 1326 in the outer stand 1324. Further, the retractably extending of the inner stand 1326 adjusts a length of the stand 1206 defined between the first end 1208 and the second end 1210. Further, the length of the stand 1206 corresponds to one of the plurality of positions.

Figure 14:
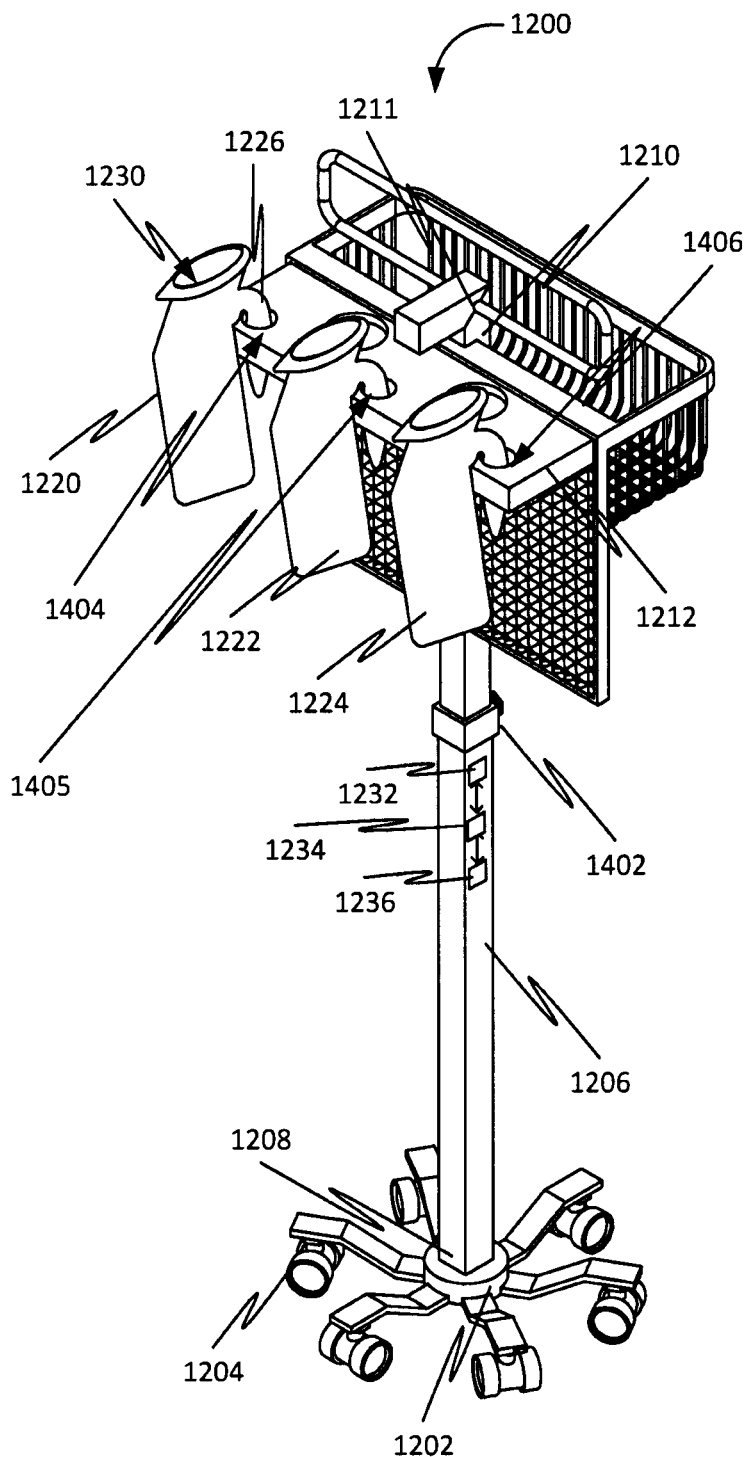
FIG. 14 is a front top right-side perspective view of the apparatus for facilitating managing multiple biological fluid containers, in accordance with some embodiments.

In further embodiments, the apparatus 1200 may include an adjusting member 1402 (as shown in FIG. 14) operationally coupled with the stand 1206. Further, the adjusting member 1402 may be configured for disengagebly engaging the inner stand 1326 with the outer stand 1324 for unlockably locking the inner stand 1326 to the one of the plurality of positions based on retractably extending. Further, the adjusting member 1402 may include an adjustment knob.

Further, in some embodiments, the fluid holder tray 1212 may include a plurality of receptacle inserts 1404-1406 (as shown in FIG. 14) disposed in the plurality of receptacles 1214-1218. Further, the plurality of receptacle inserts 1404-1406 may be configured for inwardly pressing the plurality of biological fluid containers 1220-1224 received in the plurality of receptacles 1214-1218. Further, the unmovably securing of the plurality of biological fluid containers 1220-1224 may be based on the inwardly pressing.

Further, in some embodiments, a width 1201 associated with the fluid holder tray 1212 may be 3.0 inches. Further, a length 1203 associated with the fluid holder tray 1212 may be 12.0 inches. Further, a width 1205 associated with the fluid holder tray 1212 may be 12.0 inches.

FIG. 13 is a front top right-side perspective view of the apparatus 1200 for facilitating managing multiple biological fluid containers, in accordance with some embodiments.

FIG. 14 is a front top right-side perspective view of the apparatus 1200 for facilitating managing multiple biological fluid containers, in accordance with some embodiments.

Figure 15:
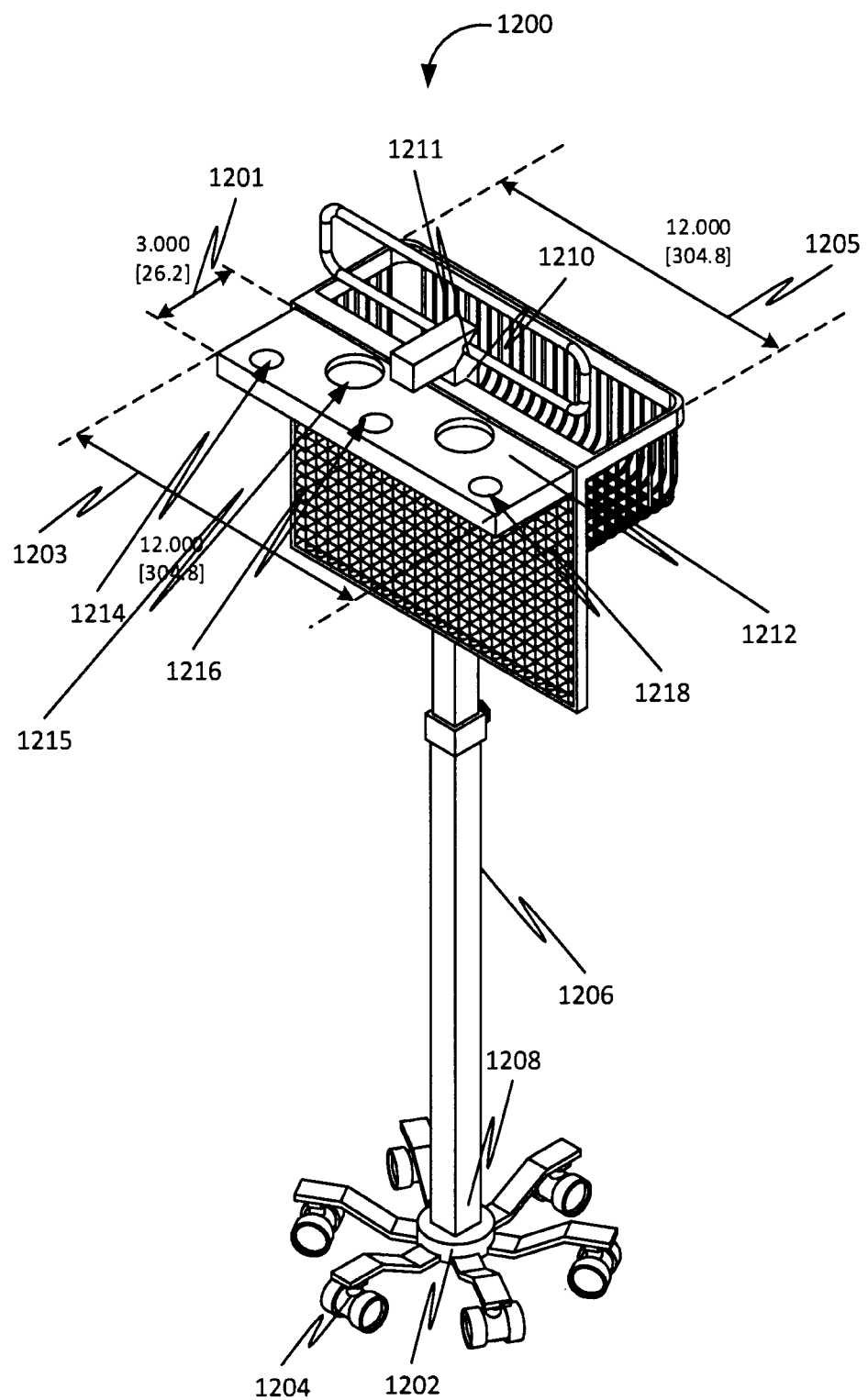
FIG. 15 is a front top right-side perspective view of the apparatus for facilitating managing multiple biological fluid containers, in accordance with some embodiments.

FIG. 15 is a front top right-side perspective view of the apparatus 1200 for facilitating managing multiple biological fluid containers, in accordance with some embodiments.

Figure 16:
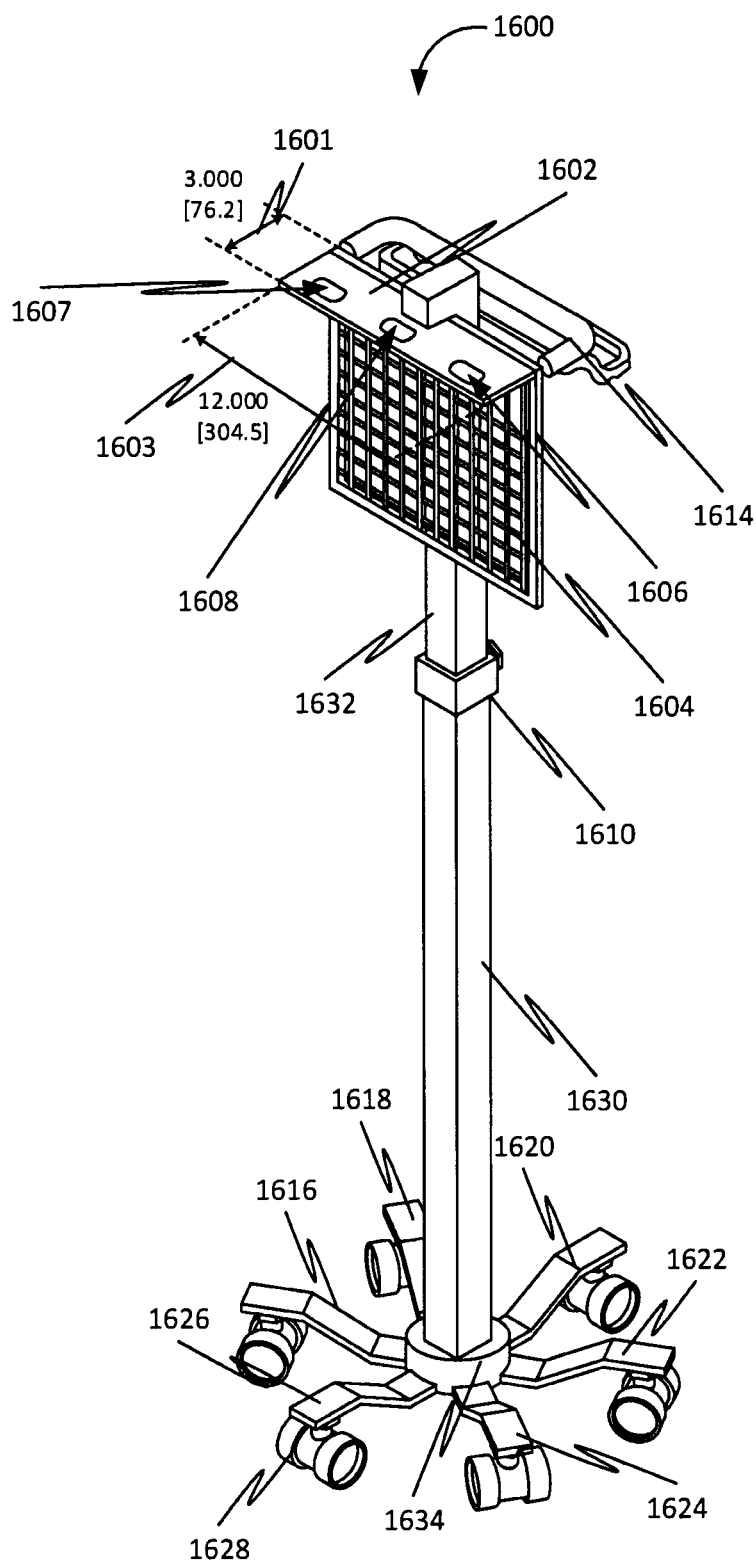
FIG. 16 is a front top right-side perspective view of an apparatus for facilitating managing multiple biological fluid containers, in accordance with some embodiments.

FIG. 16 is a front top right-side perspective view of an apparatus 1600 for facilitating managing multiple biological fluid containers, in accordance with some embodiments. Accordingly, the apparatus 1600 may include a urinal holder tray 1602, a rear guard 1604, a plurality of receptacles 1606-1608, an adjustment member 1610, and a vertical handle 1614. Further, the apparatus 1600 may include a wheel base 1634 attached to a main outer stand 1630. Further, the main outer stand 1630 may be couplable with a main inner stand 1632. Further, the wheel base 1634 may include at least one wheel 1628 attached to a plurality of base arms 1616-1626. Further, a width 1601 associated with the urinal holder tray 1602 may be 3.0 inches. Further, a length 1603 associated with the urinal holder tray 1602 may be 12.0 inches.

Figure 17:
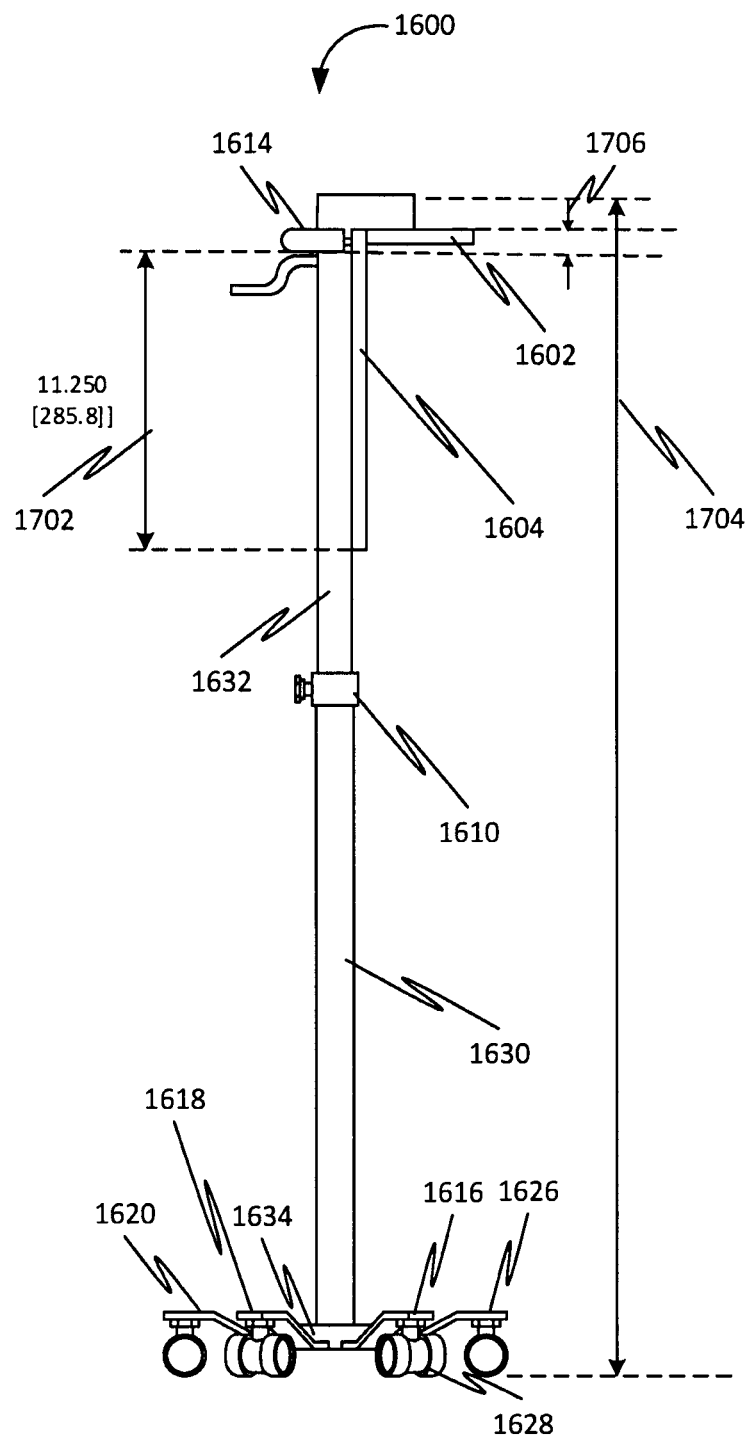
FIG. 17 is a left-side view of the apparatus for facilitating managing multiple biological fluid containers, in accordance with some embodiments.

FIG. 17 is a left-side view of the apparatus 1600 for facilitating managing multiple biological fluid containers, in accordance with some embodiments. Accordingly, a height 1702 associated with the rear guard 1604 may be 11.250 inches. Further, a height 1704 associated with the apparatus 1600 may be 55.50 inches. Further, a width 1706 associated with the urinal holder tray 1602 may be 0.750 inches.

Figure 18:
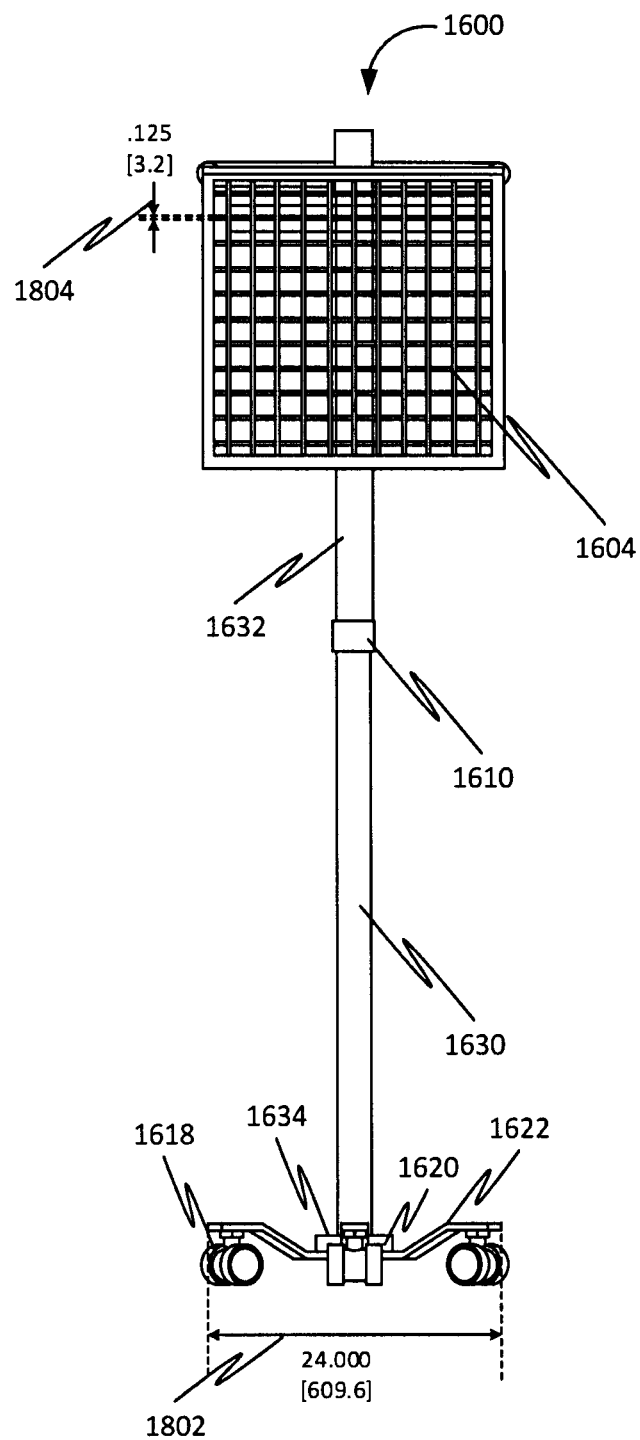
FIG. 18 is a rear view of the apparatus for facilitating managing multiple biological fluid containers, in accordance with some embodiments.

FIG. 18 is a rear view of the apparatus 1600 for facilitating managing multiple biological fluid containers, in accordance with some embodiments. Accordingly, a width 1802 associated with the wheel base 1634 may be 24.0 inches. Further, the rear guard 1604 may include a plurality of rod-like structures. Further, a width 1804 associated with the plurality of rod-like structures may be 0.125 inches.

Figure 19:
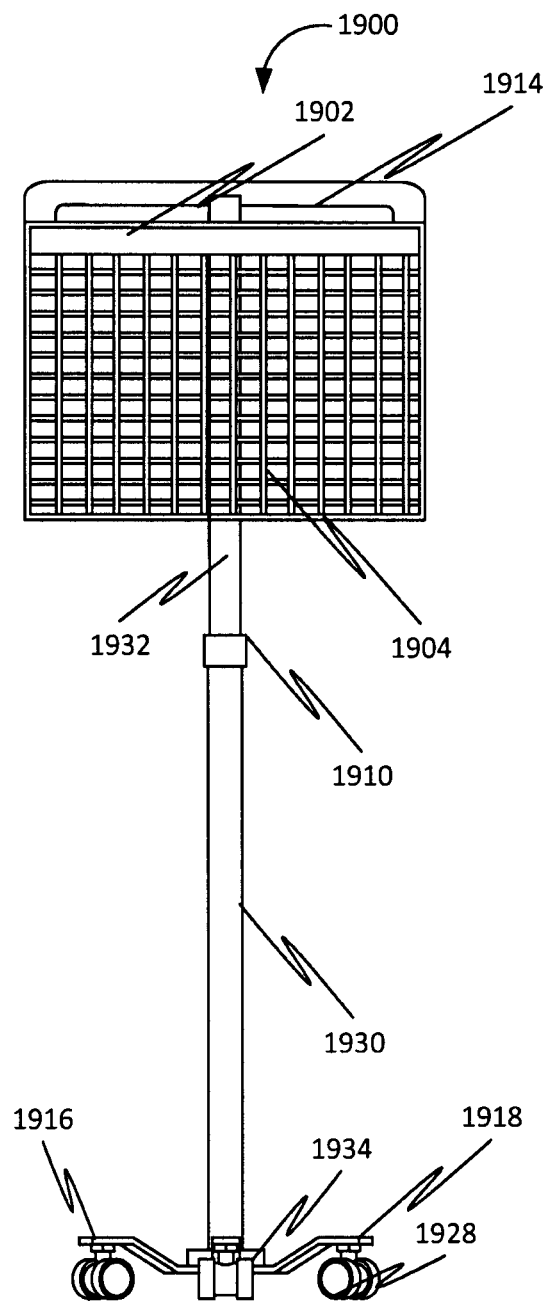
FIG. 19 is a front view of an apparatus for facilitating managing multiple biological fluid containers, in accordance with some embodiments.

FIG. 19 is a front view of an apparatus 1900 for facilitating managing multiple biological fluid containers, in accordance with some embodiments. Accordingly, the apparatus 1900 may include a urinal holding tray 1902, a rear guard 1904, an adjustment member 1910, and a vertical handle 1914. Further, the apparatus 1900 may include a wheel base 1934 attached to a main outer stand 1930. Further, the main outer stand 1930 may be couplable with a main inner stand 1932. Further, the wheel base 1934 may include at least one wheel 1928 attached to a plurality of base arms 1916-1918. Further, the urinal holder tray 1902 may include a plurality of receptacles.

Figure 20:
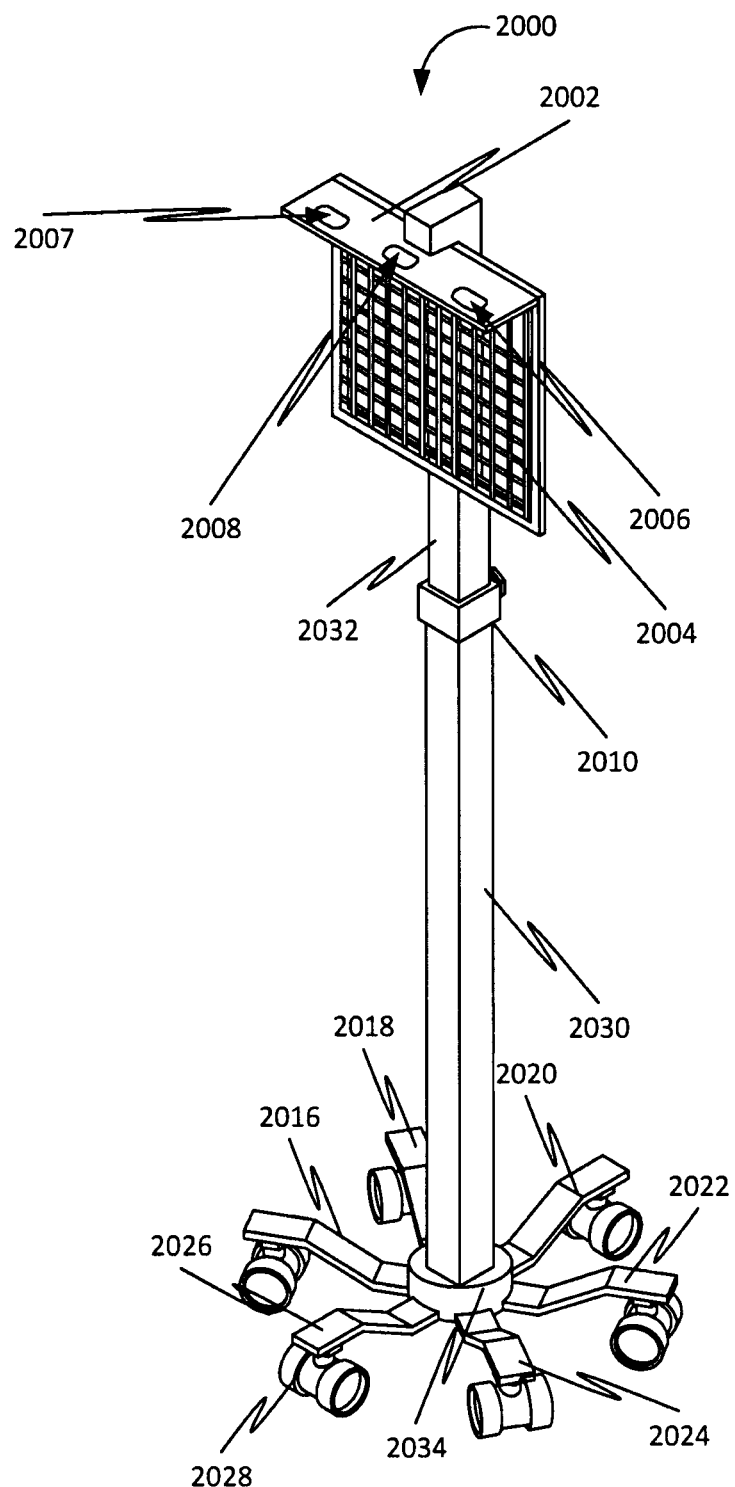
FIG. 20 is a front top right-side perspective view of an apparatus for facilitating managing multiple biological fluid containers, in accordance with some embodiments.

FIG. 20 is a front top right-side perspective view of an apparatus 2000 for facilitating managing multiple biological fluid containers, in accordance with some embodiments. Accordingly, the apparatus 2000 may include a urinal holding tray 2002, a rear guard 2004, a plurality of receptacles 2006-2008, and an adjustment member 2010. Further, the apparatus 2000 may include a wheel base 2034 attached to a main outer stand 2030. Further, the main outer stand 2030 may be couplable with a main inner stand 2032. Further, the wheel base 2034 may include at least one wheel 2028 attached to each of a plurality of base arms 2016-2026.

Figure 21:
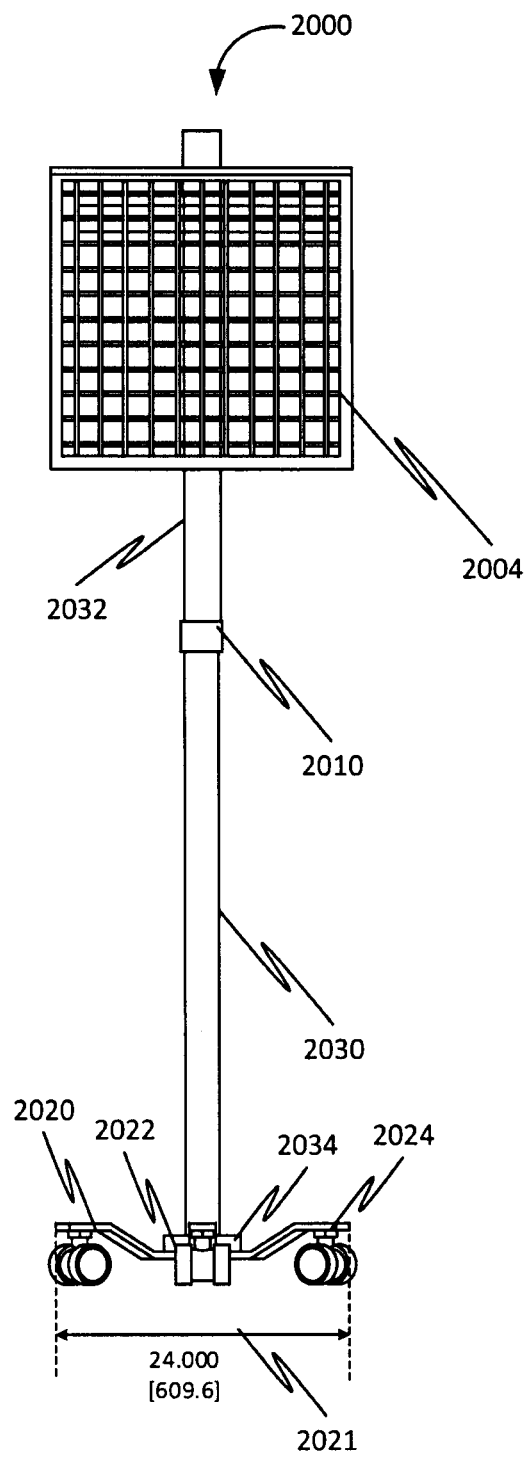
FIG. 21 is a rear view of the apparatus for facilitating managing multiple biological fluid containers, in accordance with some embodiments.

FIG. 21 is a rear view of the apparatus 2000 for facilitating managing multiple biological fluid containers, in accordance with some embodiments. Further, a width 2021 associated with the wheel base 2034 may be 24.0 inches.

Figure 22:
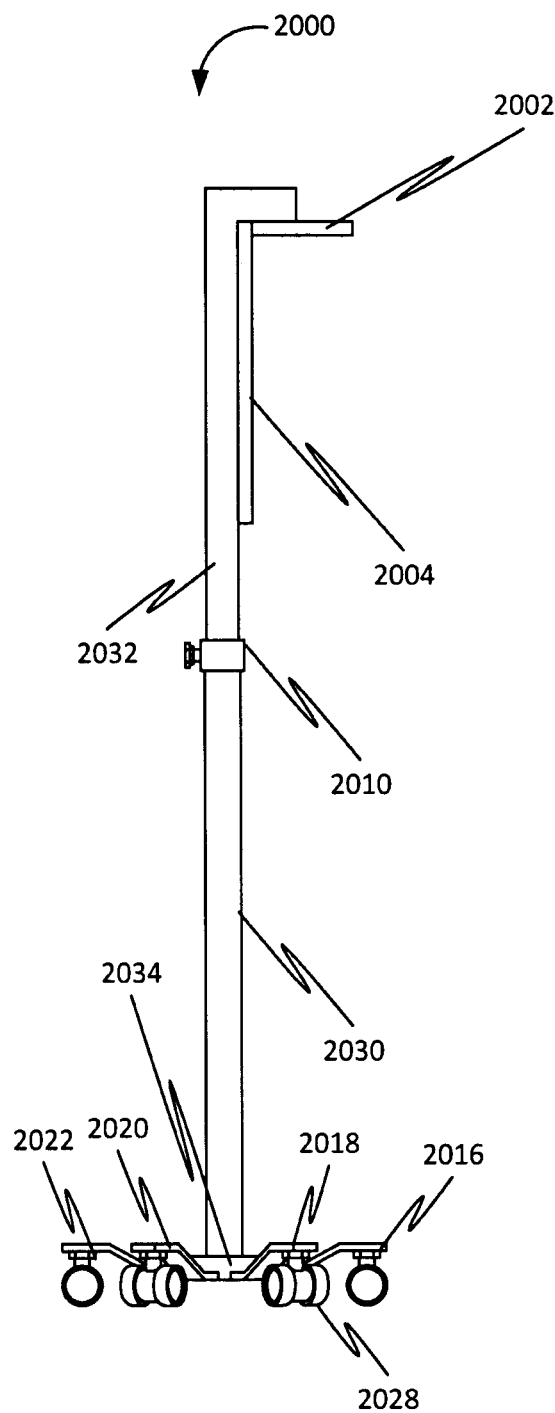
FIG. 22 is a left-side view of the apparatus for facilitating managing multiple biological fluid containers, in accordance with some embodiments.

FIG. 22 is a left-side view of the apparatus 2000 for facilitating managing multiple biological fluid containers, in accordance with some embodiments.

Figure 23:
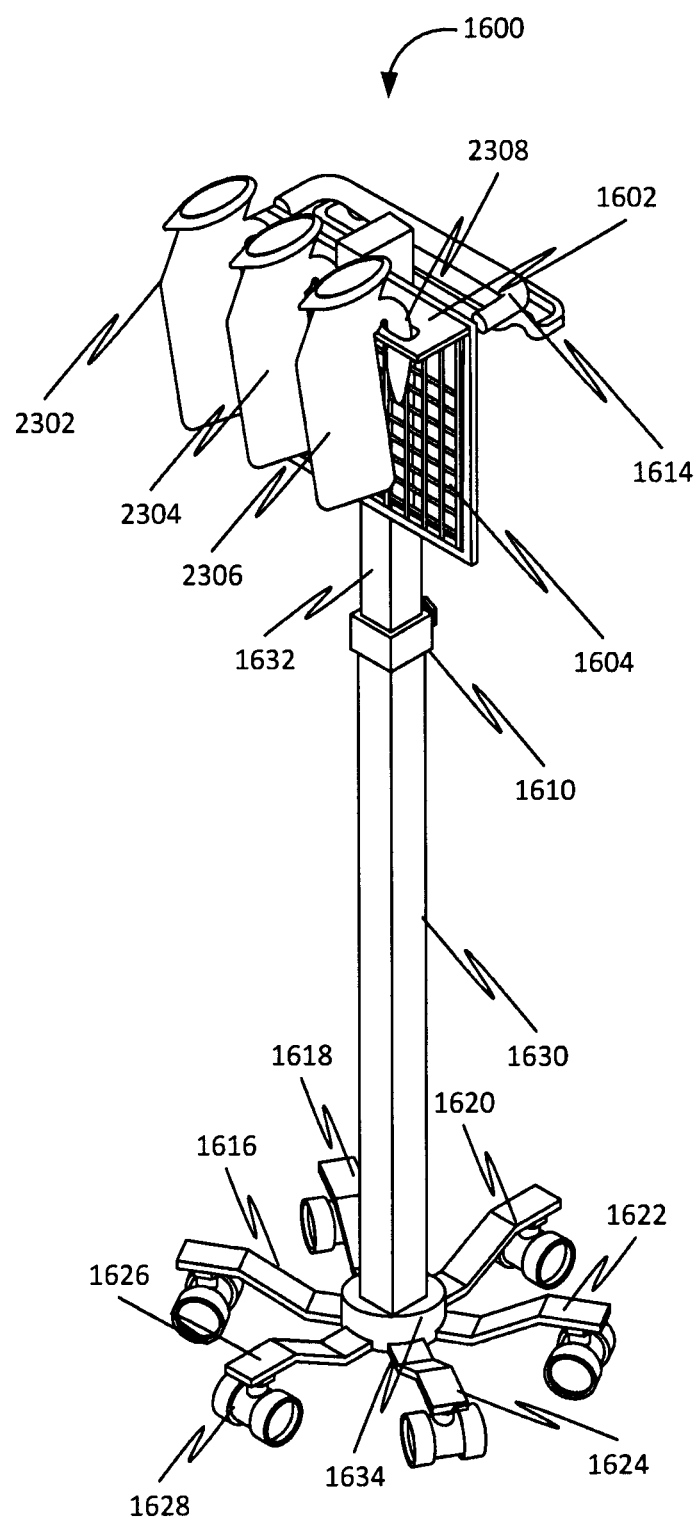
FIG. 23 is a front top right-side perspective view of the apparatus for facilitating managing multiple biological fluid containers, in accordance with some embodiments.

FIG. 23 is a front top right-side perspective view of the apparatus 1600 for facilitating managing multiple biological fluid containers, in accordance with some embodiments. Accordingly, the plurality of receptacles 1606-1608 may be configured for receiving a hook 2308 comprised in each of a plurality of urinal containers 2302-2306.

Figure 24:
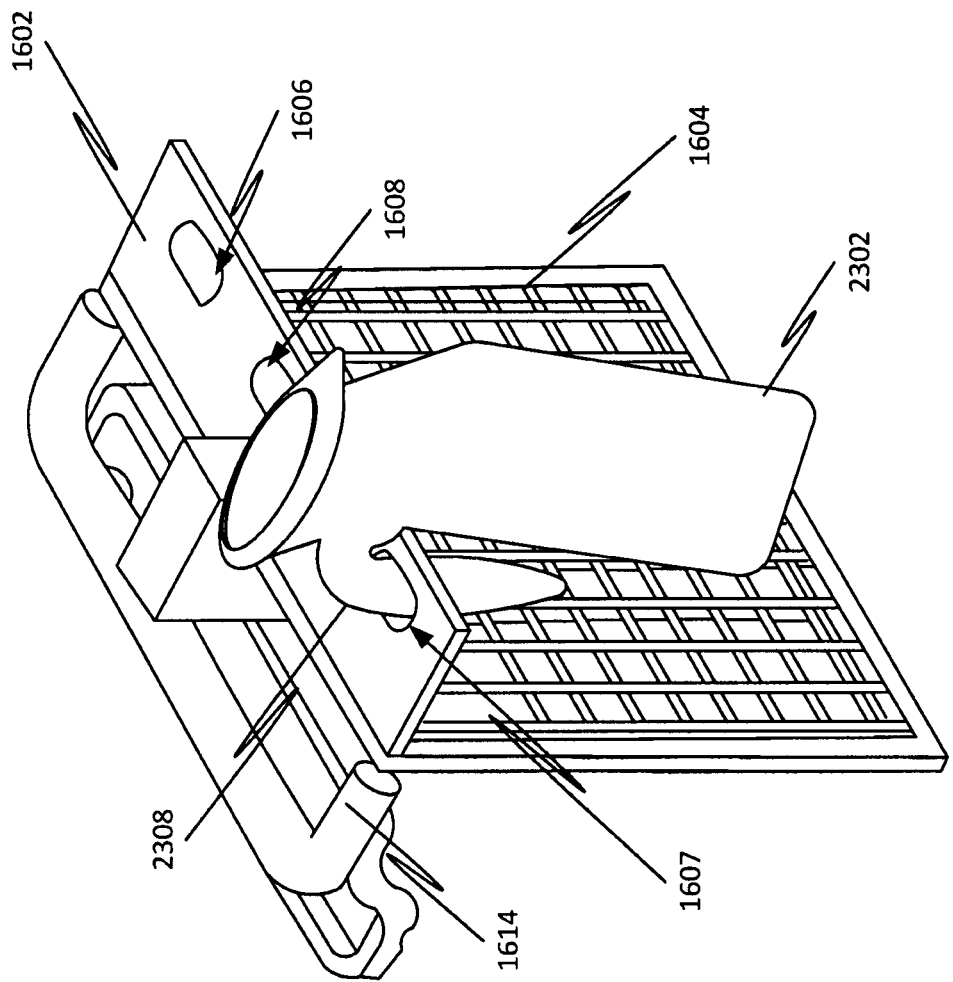
FIG. 24 is an enlarged view of the urinal holder tray, a urinal container of the plurality of urinal containers, the vertical handle, and the rear guard comprised in the apparatus for facilitating managing multiple biological fluid containers, in accordance with some embodiments.

FIG. 24 is an enlarged view of the urinal holder tray 1602, a urinal container 2302 of the plurality of urinal containers 2302-2306, the vertical handle 1614, and the rear guard 1604 comprised in the apparatus 1600 for facilitating managing multiple biological fluid containers, in accordance with some embodiments.

Figure 25:
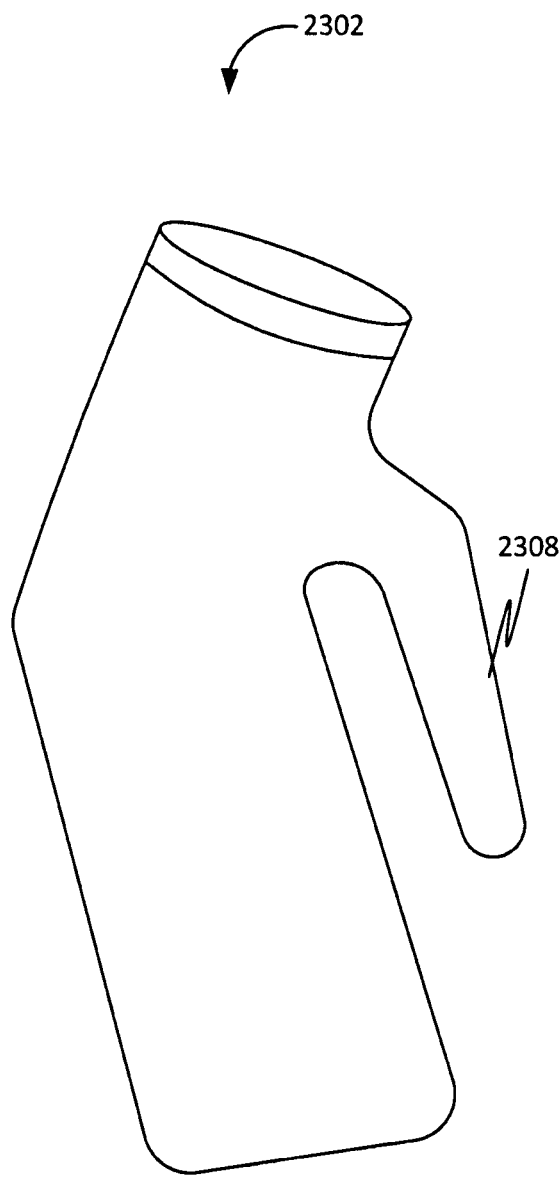
FIG. 25 is a right-side view of the container of the plurality of containers comprised in the apparatus for facilitating managing multiple biological fluid containers, in accordance with some embodiments.

FIG. 25 is a right-side view of the container 2302 of the plurality of containers 2302-2306 comprised in the apparatus 1600 for facilitating managing multiple biological fluid containers, in accordance with some embodiments.

Figure 26:
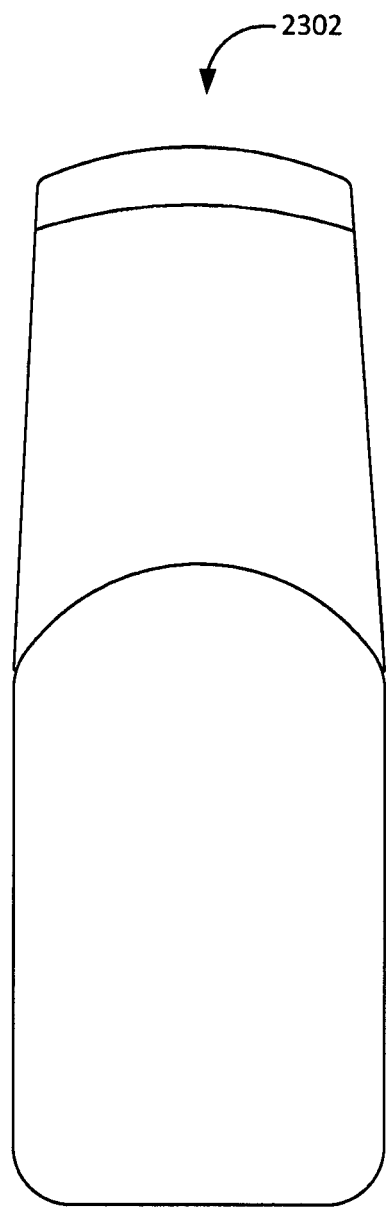
FIG. 26 is a front view of the container of the plurality of containers comprised in the apparatus for facilitating managing multiple biological fluid containers, in accordance with some embodiments.

FIG. 26 is a front view of the container 2302 of the plurality of containers 2302-2306 comprised in the apparatus 1600 for facilitating managing multiple biological fluid containers, in accordance with some embodiments.

Figure 27:
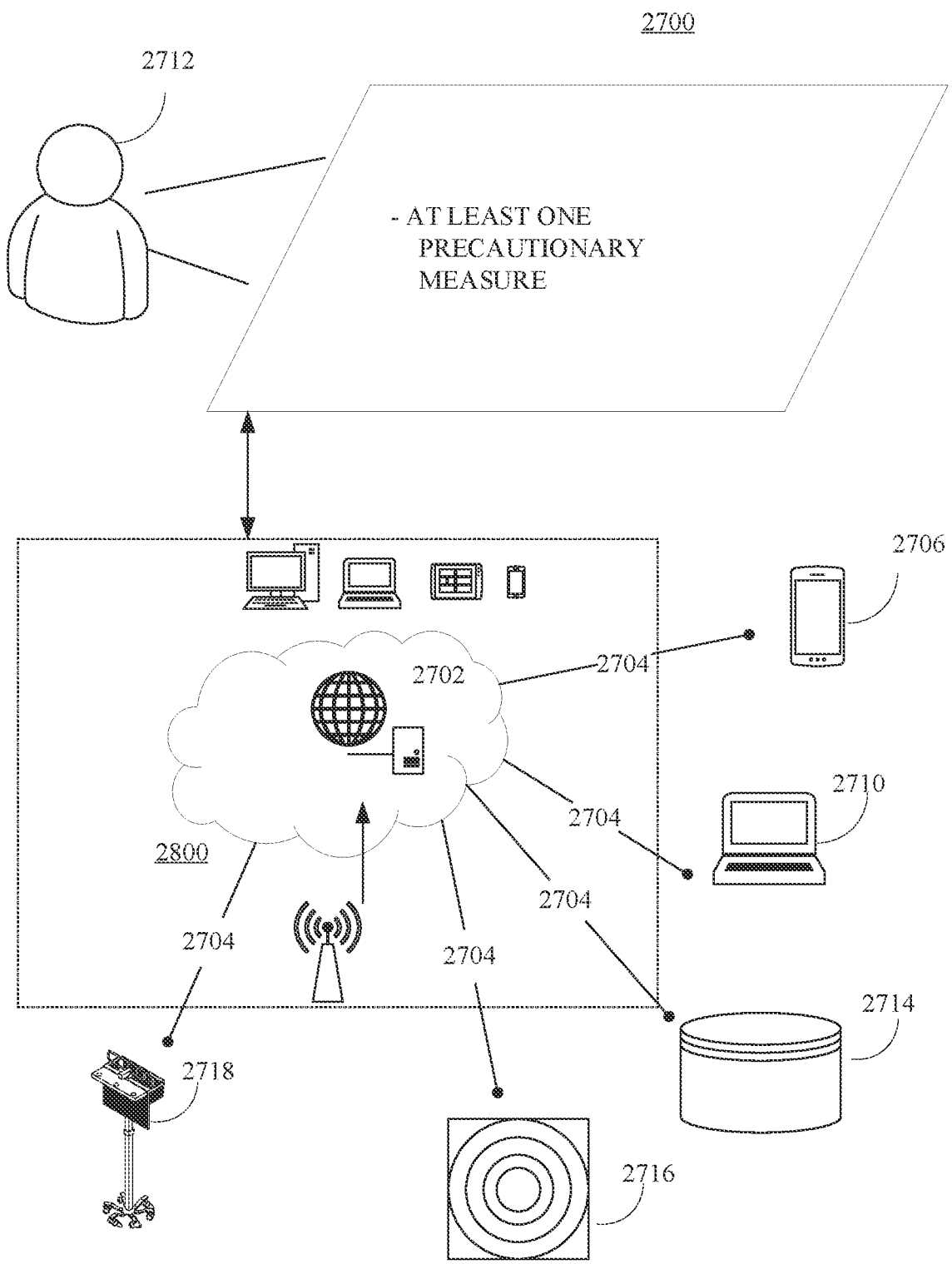
FIG. 27 is an illustration of an online platform consistent with various embodiments of the present disclosure.

FIG. 27 is an illustration of an online platform 2700 consistent with various embodiments of the present disclosure. By way of non-limiting example, the online platform 2700 for facilitating managing multiple biological fluid containers may be hosted on a centralized server 2702, such as, for example, a cloud computing service. The centralized server 2702 may communicate with other network entities, such as, for example, a mobile device 2706 (such as a smartphone, a laptop, a tablet computer, etc.), other electronic devices 2710 (such as desktop computers, server computers, etc.), databases 2714, sensors 2716, and an apparatus 2718 (such as the apparatus 100 for facilitating managing multiple biological fluid containers) over a communication network 2704, such as, but not limited to, the Internet. Further, users of the online platform 2700 may include relevant parties such as, but not limited to, end-users, administrators, service providers, service consumers and so on. Accordingly, in some instances, electronic devices operated by the one or more relevant parties may be in communication with the platform.

A user 2712, such as the one or more relevant parties, may access online platform 2700 through a web based software application or browser. The web based software application may be embodied as, for example, but not limited to, a website, a web application, a desktop application, and a mobile application compatible with a computing device 2800.

Figure 28:
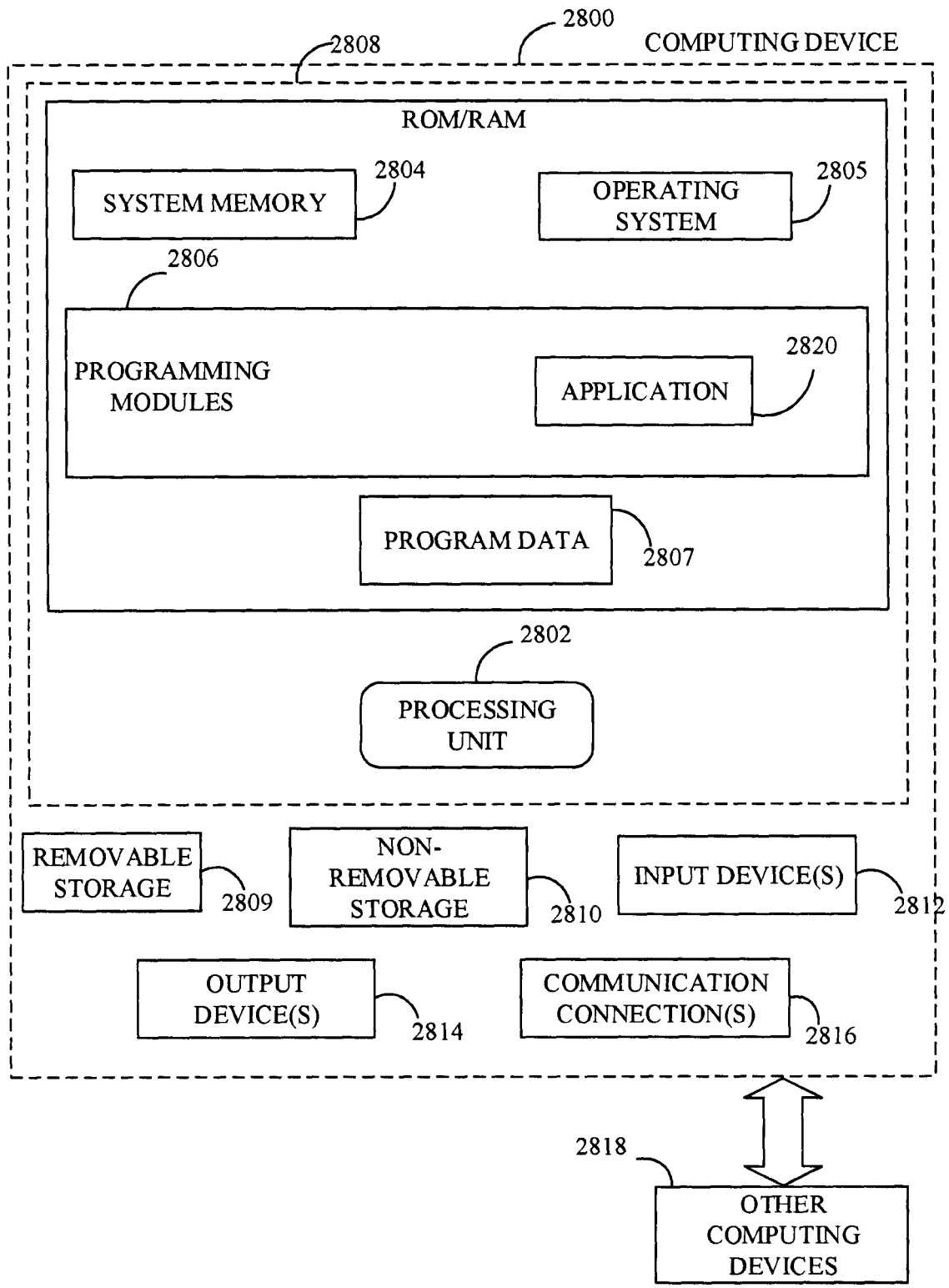
FIG. 28 is a block diagram of a computing device for implementing the methods disclosed herein, in accordance with some embodiments.

With reference to FIG. 28, a system consistent with an embodiment of the disclosure may include a computing device or cloud service, such as computing device 2800. In a basic configuration, computing device 2800 may include at least one processing unit 2802 and a system memory 2804. Depending on the configuration and type of computing device, system memory 2804 may comprise, but is not limited to, volatile (e.g. random-access memory (RAM)), non-volatile (e.g. read-only memory (ROM)), flash memory, or any combination. System memory 2804 may include operating system 2805, one or more programming modules 2806, and may include a program data 2807. Operating system 2805, for example, may be suitable for controlling computing device 2800's operation. In one embodiment, programming modules 2806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 28 by those components within a dashed line 2808.

Computing device 2800 may have additional features or functionality. For example, computing device 2800 may also include additional data storage devices (removable and/or non-removable) such as, for example, magnetic disks, optical disks, or tape. Such additional storage is illustrated in FIG. 28 by a removable storage 2809 and a non-removable storage 2810. Computer storage media may include volatile and non-volatile, removable and non-removable media implemented in any method or technology for storage of information, such as computer-readable instructions, data structures, program modules, or other data. System memory 2804, removable storage 2809, and non-removable storage 2810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2800. Any such computer storage media may be part of device 2800. Computing device 2800 may also have input device(s) 2812 such as a keyboard, a mouse, a pen, a sound input device, a touch input device, a location sensor, a camera, a biometric sensor, etc. Output device(s) 2814 such as a display, speakers, a printer, etc. may also be included. The aforementioned devices are examples and others may be used.

Computing device 2800 may also contain a communication connection 2816 that may allow device 2800 to communicate with other computing devices 2818, such as over a network in a distributed computing environment, for example, an intranet or the Internet. Communication connection 2816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2804, including operating system 2805. While executing on processing unit 2802, programming modules 2806 (e.g., application 2820) may perform processes including, for example, one or more stages of methods, algorithms, systems, applications, servers, databases as described above. The aforementioned process is an example, and processing unit 2802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. An apparatus for facilitating managing multiple biological fluid containers, the apparatus comprising:
a base configured to be stationarily and movably disposed on at least one surface for allowing at least one movement of the apparatus on the at least one surface, wherein the allowing of the at least one movement facilitates the managing of the multiple biological fluid containers, wherein the base comprises at least one wheel configurable for discontinuously rotating around at least one axis, wherein the discontinuously rotating of the at least one wheel stationarily and movably disposes the base on the at least one surface;
a stand extending between a first end and a second end in relation to the base, wherein the first end of the stand is coupled with the base for vertically attaching the stand to the base;
a fluid holder tray attached to an upper portion of the stand proximal to the second end of the stand, wherein the fluid holder tray extends laterally away from the stand, wherein the fluid holder tray is configured for holding a plurality of biological fluid containers, wherein the fluid holder tray comprises a plurality of receptacles, wherein the plurality of receptacles is configured for removably receiving the plurality of biological fluid containers, wherein the plurality of receptacles is configured for unmovably securing the plurality of biological fluid containers to the fluid holder tray based on receiving of the plurality of biological fluid containers, wherein the plurality of receptacles comprises a plurality of orifices, wherein each of the plurality of orifices is configured for receiving a hook comprised in each of the plurality of biological fluid containers, wherein the unmovably securing of the plurality of biological fluid containers is based on the receiving of the hook, wherein the unmovably securing of each of the plurality of biological fluid containers prevents spilling of at least one biological fluid stored in an interior space of each of the plurality of biological fluid containers through an opening of each of the plurality of biological fluid containers during the at least one movement of the apparatus; and
a rear guard coupled with the stand, wherein the rear guard is attached to the upper portion of the stand, wherein the rear guard is oriented perpendicular to the fluid holder tray, wherein the rear guard is configurable for elastically deforming based on an impact received by the plurality of biological fluid containers corresponding to a movement of the plurality of biological fluid containers, wherein the elastically deforming dampens the movement of the plurality of biological fluid containers, wherein the dampening of the movement of the plurality of biological fluid containers prevents the spilling of the at least one biological fluid.

2. The apparatus of claim 1, wherein the plurality of receptacles comprises a plurality of indentations, wherein each of the plurality of indentations is configured for receiving a body of each of the plurality of biological fluid containers, wherein the receiving of the body of each of the plurality of biological fluid containers snugly disposes each of the plurality of biological fluid containers in each of the plurality of indentations for the unmovably securing of each of the plurality of biological fluid containers to the fluid holder tray.

3. The apparatus of claim 1, wherein the base further comprises a locking brake operationally coupled with the at least one wheel, wherein the locking brake is configured for transitioning between a locked state and an unlocked state, wherein the locking brake is configured for arresting rotating of the at least one wheel in the locked for stationarily disposing the base on the at least one surface, wherein the locking brake is configured for allowing the rotating of the at least one wheel for movably disposing the base on the at least one surface, wherein the allowing of the at least one movement is based on the stationarily disposing of the base and the movably disposing of the base.

4. The apparatus of claim 1, wherein the base comprises a wheel base, wherein the wheel base comprises a plurality of base arms radially attached to the wheel base for vertically supporting the stand on the wheel base, wherein a proximal end of the each of the plurality of base arms is attached to the wheel base and a distal end of each of the plurality of base arms extends radially away from the wheel base, wherein the at least one wheel is attached to a distal portion of each of the plurality of arms proximal to the distal end of each of the plurality of base arms.

5. The apparatus of claim 1, wherein the stand comprises an outer stand and an inner stand, wherein the outer stand comprises a receptacle and a stand opening leading into the receptacle, wherein the inner stand is movably disposed in the receptacle through the stand opening, wherein the inner stand is configured to be retractably extending between a plurality of positions in relation to the outer stand based on movably disposing of the inner stand in the outer stand, wherein the retractably extending of the inner stand adjusts a length of the stand defined between the first end and the second end, wherein the length of the stand corresponds to one of the plurality of positions.

6. The apparatus of claim 5 further comprising an adjusting member operationally coupled with the stand, wherein the adjusting member is configured for disengagebly engaging the inner stand with the outer stand for unlockably locking the inner stand to the one of the plurality of positions based on the retractably extending.

7. The apparatus of claim 1, wherein the fluid holder tray comprises a plurality of receptacle inserts disposed in the plurality of receptacles, wherein the plurality of receptacle inserts is configured for inwardly pressing the plurality of biological fluid containers received in the plurality of receptacles, wherein the unmovably securing of the plurality of biological fluid containers is further based on the inwardly pressing.

8. The apparatus of claim 7, wherein the plurality of receptacle inserts is configured for orienting the plurality of biological fluid containers received in the plurality of receptacles in at least one orientation, wherein the inwardly pressing comprises directionally inwardly pressing of the plurality of biological fluid containers in at least one direction in relation to the stand, wherein the orienting of the plurality of biological fluid containers is based on the directionally inwardly pressing of the plurality of biological fluid containers.

9. The apparatus of claim 1 further comprises a basket attached to the upper portion of the stand, wherein the basket opposes the fluid holder tray, wherein the basket comprises a basket opening and a basket interior space, wherein the plurality of biological fluid containers comprises at least one additional biological fluid container, wherein the basket is configured for removably receiving the at least one additional biological fluid container in the basket interior space through the basket opening.

10. The apparatus of claim 1, wherein the stand further comprises a handle attached to the upper portion of the stand proximal to the second end, wherein the handle is configured for receiving at least one moving action, wherein the discontinuously rotating of the at least one wheel is further based on the receiving of the at least one moving action.

11. The apparatus of claim 1 further comprising:
at least one sensor disposed on the apparatus, wherein the at least one sensor is configured for generating at least one sensor data based on detecting a level of a hazardous element present in the biological fluid, wherein the at least one sensor data comprises the level of the hazardous element;
a processing device communicatively coupled with the at least one sensor, wherein the processing device is configured for analyzing the at least one sensor data, wherein the processing device is configured for generating at least one precautionary measure based on the analyzing, wherein the at least one precautionary measure alerts at least one user about the hazard for protecting the at least one user from the hazard; and
a communication device communicatively coupled to the processing device, wherein the communication device is configured for transmitting the at least one precautionary measure to at least one device associated with the at least one user.

12. The apparatus of claim 11 further comprising an output device communicatively coupled to the processing device, wherein the output device is configured for presenting the at least one precautionary measure.

13. An apparatus for facilitating managing multiple biological fluid containers, the apparatus comprising:
a base configured to be stationarily and movably disposed on at least one surface for allowing at least one movement of the apparatus on the at least one surface, wherein the allowing of the at least one movement facilitates the managing of the multiple biological fluid containers, wherein the base comprises at least one wheel configurable for discontinuously rotating around at least one axis, wherein the discontinuously rotating of the at least one wheel stationarily and movably disposes the base on the at least one surface;
a stand extending between a first end and a second end in relation to the base, wherein the first end of the stand is coupled with the base for vertically attaching the stand to the base;
a fluid holder tray attached to an upper portion of the stand proximal to the second end of the stand, wherein the fluid holder tray extends laterally away from the stand, wherein the fluid holder tray is configured for holding a plurality of biological fluid containers, wherein the fluid holder tray comprises a plurality of receptacles, wherein the plurality of receptacles is configured for removably receiving the plurality of biological fluid containers, wherein the plurality of receptacles is configured for unmovably securing the plurality of biological fluid containers to the fluid holder tray based on receiving of the plurality of biological fluid containers, wherein the plurality of receptacles comprises a plurality of orifices, wherein each of the plurality of orifices is configured for receiving a hook comprised in each of the plurality of biological fluid containers, wherein the unmovably securing of the plurality of biological fluid containers is based on the receiving of the hook, wherein the unmovably securing of each of the plurality of biological fluid containers prevents spilling of at least one biological fluid stored in an interior space of each of the plurality of biological fluid containers through an opening of each of the plurality of biological fluid containers during the at least one movement of the apparatus;
at least one sensor disposed on the apparatus, wherein the at least one sensor is configured for generating at least one sensor data based on detecting a level of a hazardous element present in the biological fluid, wherein the at least one sensor data comprises the level of the hazardous element;
a processing device communicatively coupled with the at least one sensor, wherein the processing device is configured for analyzing the at least one sensor data, wherein the processing device is configured for generating at least one precautionary measure based on the analyzing, wherein the at least one precautionary measure alerts at least one user about the hazard for protecting the at least one user from the hazard; and a communication device communicatively coupled to the processing device, wherein the communication device is configured for transmitting the at least one precautionary measure to at least one device associated with the at least one user.

14. The apparatus of claim 13, wherein the plurality of receptacles comprises a plurality of indentations, wherein each of the plurality of indentations is configured for receiving a body of each of the plurality of biological fluid containers, wherein the receiving of the body of each of the plurality of biological fluid containers snugly disposes each of the plurality of biological fluid containers in each of the plurality of indentations for the unmovably securing of each of the plurality of biological fluid containers to the fluid holder tray.

15. The apparatus of claim 13, wherein the base further comprises a locking brake operationally coupled with the at least one wheel, wherein the locking brake is configured for transitioning between a locked state and an unlocked state, wherein the locking brake is configured for arresting rotating of the at least one wheel in the locked for stationarily disposing the base on the at least one surface, wherein the locking brake is configured for allowing the rotating of the at least one wheel for movably disposing the base on the at least one surface, wherein the allowing of the at least one movement is based on the stationarily disposing of the base and the movably disposing of the base.

16. The apparatus of claim 13, wherein the base comprises a wheel base, wherein the wheel base comprises a plurality of base arms radially attached to the wheel base for vertically supporting the stand on the wheel base, wherein a proximal end of the each of the plurality of base arms is attached to the wheel base and a distal end of each of the plurality of base arms extends radially away from the wheel base, wherein the at least one wheel is attached to a distal portion of each of the plurality of arms proximal to the distal end of each of the plurality of base arms.

17. The apparatus of claim 13, wherein the stand comprises an outer stand and an inner stand, wherein the outer stand comprises a receptacle and a stand opening leading into the receptacle, wherein the inner stand is movably disposed in the receptacle through the stand opening, wherein the inner stand is configured to be retractably extending between a plurality of positions in relation to the outer stand based on movably disposing of the inner stand in the outer stand, wherein the retractably extending of the inner stand adjusts a length of the stand defined between the first end and the second end, wherein the length of the stand corresponds to one of the plurality of positions.

18. The apparatus of claim 17 further comprising an adjusting member operationally coupled with the stand, wherein the adjusting member is configured for disengageably engaging the inner stand with the outer stand for unlockably locking the inner stand to the one of the plurality of positions based on retractably extending.

19. The apparatus of claim 13, wherein the fluid holder tray comprises a plurality of receptacle inserts disposed in the plurality of receptacles, wherein the plurality of receptacle inserts is configured for inwardly pressing the plurality of biological fluid containers received in the plurality of receptacles, wherein the unmovably securing of the plurality of biological fluid containers is further based on the inwardly pressing.

* * * * *